United States Patent
Voloshynovskiy et al.

(10) Patent No.: US 8,705,873 B2
(45) Date of Patent: Apr. 22, 2014

(54) SECURE ITEM IDENTIFICATION AND AUTHENTICATION SYSTEM AND METHOD BASED ON UNCLONABLE FEATURES

(75) Inventors: Sviatoslav Voloshynovskiy, Geneva (CH); Oleksiy Koval, Genève (CH); Thierry Pun, Chêne-Bougeries (CH)

(73) Assignee: Universite de Geneve, Geneva (CH)

( * ) Notice: Subject to any disclaimer, the term of this patent is extended or adjusted under 35 U.S.C. 154(b) by 554 days.

(21) Appl. No.: 12/933,596

(22) PCT Filed: Mar. 20, 2009

(86) PCT No.: PCT/EP2009/053334
§ 371 (c)(1),
(2), (4) Date: Dec. 13, 2010

(87) PCT Pub. No.: WO2009/115611
PCT Pub. Date: Sep. 24, 2009

(65) Prior Publication Data
US 2011/0096955 A1    Apr. 28, 2011

Related U.S. Application Data

(60) Provisional application No. 61/038,084, filed on Mar. 20, 2008.

(51) Int. Cl.
*G06K 9/68* (2006.01)
(52) U.S. Cl.
USPC .......................................................... 382/218
(58) Field of Classification Search
None
See application file for complete search history.

(56) References Cited

U.S. PATENT DOCUMENTS

2008/0002882 A1    1/2008   Voloshynovskyy et al.

OTHER PUBLICATIONS

Beekhof, Fokko, et al. "Secure surface identification codes." Electronic Imaging 2008. International Society for Optics and Photonics, Feb. 26, 2008. Conference vol. 6819, San Jose California, Jan. 27, 2008.*

Voloshynovskiy, et al., "Unclonablbe Identification and Authentication based on Reference List Decoding", SECSI (Secure Component and System Identification), Mar. 17, 2008, XP002555296, pp. 1-26, http://sharcs.crypto.rub.de/files/SECS.

* cited by examiner

*Primary Examiner* — Stephen R Koziol
*Assistant Examiner* — Raphael Schwartz
(74) *Attorney, Agent, or Firm* — Browdy and Neimark, PLLC

(57) ABSTRACT

The present invention is a method and apparatus for protection of various items against counterfeiting using physical unclonable features of item microstructure images. The protection is based on the proposed identification and authentication protocols coupled with portable devices. In both cases a special transform is applied to data that provides a unique representation in the secure key-dependent domain of reduced dimensionality that also simultaneously resolves performance-security-complexity and memory storage requirement trade-offs. The enrolled database needed for the identification can be stored in the public domain without any risk to be used by the counterfeiters. Additionally, it can be easily transportable to various portable devices due to its small size. Notably, the proposed transformations are chosen in such a way to guarantee the best possible performance in terms of identification accuracy with respect to the identification in the raw data domain. The authentication protocol is based on the proposed transform jointly with the distributed source coding. Finally, the extensions of the described techniques to the protection of artworks and secure key exchange and extraction are disclosed in the invention.

4 Claims, 16 Drawing Sheets

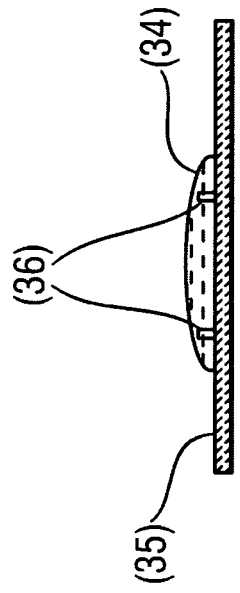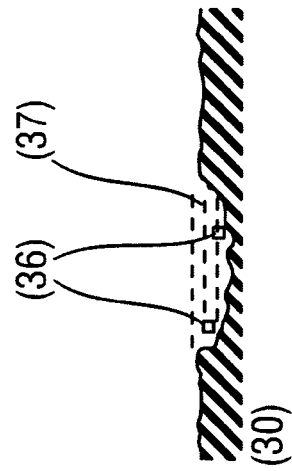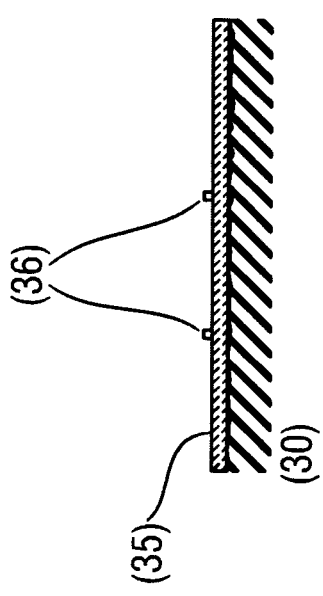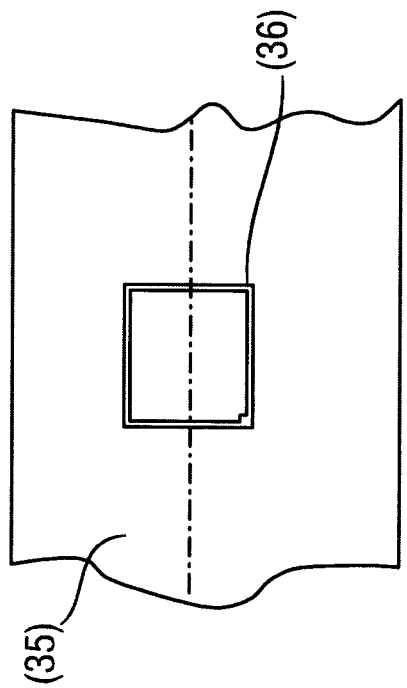

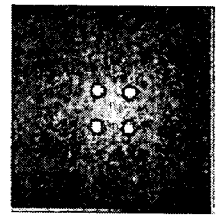 (39)
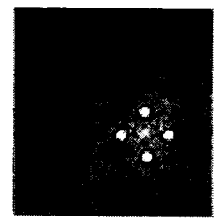 (41)
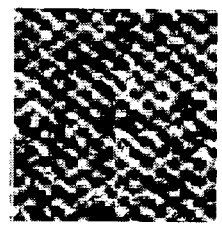 (38)
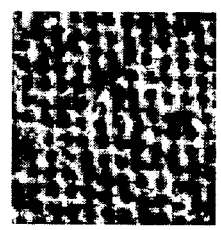 (40)
FIG. 18

SECURE ITEM IDENTIFICATION AND AUTHENTICATION SYSTEM AND METHOD BASED ON UNCLONABLE FEATURES

BACKGROUND OF THE INVENTION

This invention relates to systems and methods for authenticating products and in particular, systems and methods which use visual characteristics for verification.

Historically protection of items (under this term we will consider all physical objects of the real world) is based on the technologies, which use some features being either rare in nature or difficult to duplicate, copy or clone. Authentication is considered as the process of verification of added specific overt, covert or forensic features to the item that may verify the item as genuine. The examples of these protection technologies are numerous and include special magnetic taggants [1], invisible inks, crystals or powders with infrared (IR) or ultraviolet (UV) properties [2], optically variable materials, holograms and physical paper watermarks [3] etc. The verification of item authenticity is based either on the direct visual inspection of the added feature presence or special devices (detectors) that usually have proprietary character and are not assumed to be used in the public domain by the fear of disclosing the proprietary technology secrets behind the used technology and physical phenomena.

Among the major risk factors, the most important are threats related to the counterfeiting of items, refilling of original ones, tampering, illegal trading, production of look-alike items, illegal franchising or any mixture of the above ones.

The identification of items refers to the assignment of a special index to each item that can be used for their tracking and tracing. The assigned index is encoded and stored on the item in a printed form of a visible barcode [4] or invisible digital watermark [5] or overprinted sparse set of dots (usually yellow) [6] or specially designed storage device such as magnetic stripe, electronic smart cards or RFID [7]. Obviously, the information stored in such a way can be read and copied by any party even if the data are encrypted.

The security drawbacks of these approaches in authentication and identification applications are well known. Besides that the above techniques are mostly proprietary and kept secret by the security printing houses for years, they are still the most widely used. Moreover, some of these techniques are also quite expensive for mass usage. Contrarily, even the usage of the most advanced cryptographic techniques in the above identification protocol does not help a lot since the data are easily copied without the need to be decrypted.

Additionally, new storage devices (electronic chips, RFIDs) are still quite expensive for large-scale applications. Sometimes, there is also no possibility to embed such a device into the item structure or their presence is not acceptable due to various legal, commercial, marketing, ecological and technical reasons.

Moreover, another security drawback of both technologies is their adhesiveness. The protection mechanisms considered above are added to the item as independent objects or features, sometimes changing the properties, look, design and value of item. This has very serious complications that were not considered in early protection systems. First, the added feature has nothing to do with the actual item and its unique features and physical properties. Secondly, all these protection features can be relatively easily reproduced by modern means.

At the same time, it is well known for years that all objects and humans are unique due to the possession of special features that are difficult to clone or copy. These unclonable features are random microstructures for the physical object surfaces and biometrics (fingerprint, iris, etc.) for the humans. The unclonable features are formed by nature and naturally integrated into the items. Having a lot of advantages and being non-adhesive in the considered sense, nevertheless the unclonable features only recently become a subject of intensive theoretical investigation mostly thanks to the progress achieved in the design of cheap high resolution imaging devices.

For the sake of generality, we will define physical unclonable features (a.k.a. fingerprinting in some contexts) as unique features carried out by the objects, products or documents. The main properties of such features are: (a) they can be extracted and evaluated in a simple way, but (b) they are hard to characterize and (c) in practice cannot be copied (cloned). The unclonable features are based on the randomness created by nature that is present in practically all physical structured observed under the coherent or noncoherent excitation (light) in transparent or reflective modes. Sometimes, this randomness can be hand-made. The examples of unclonable features include the microstructures of paper, metal, plastic, fibers, speckle, wood, organic materials, crystals and gemstones, complex molecular structures etc. Therefore, the main application of unclonable features is anti-counterfeiting for identification and authentication purposes.

Although the robustness-invariance aspects of identification/authentication problems have received a lot of attention especially in computer vision, the issue of security still remains to be an open and little-studied problem. This aspect will potentially have a great impact on security applications, such as content, object, person authentication and identification, tamper evidence, synchronization, forensic analysis and brand and art protection.

The design of efficient identification/authentication techniques based on the unclonable features is a very challenging problem that should address the compromise between various conflicting requirements that cover:

robustness to distortions or reliability, i.e., the ability of identification/authentication function to produce accurate results under the legitimate distortions applied to the same data that include both signal processing and desynchronization transformations;

security, i.e., the inability of attacker to reproduce the physical unclonable feature or to trick the identification/authentication process using the leaked information about the codebook, decision rule, etc.; this also includes the one-way property or non-invertibility property similar to hashing functions, i.e., computationally expensiveness in finding original data given an index and a codebook construction, and collision-free property, which refers to the fact that given an input and a identification/authentication function, it is computationally hard to find a second image such that produces the same result outside the region of allowable distortions;

complexity, i.e., the ability to perform the identification/authentication with lowest achievable computational complexity without the considerable loss in accuracy;

memory storage, i.e., the memory needed to store the codebook or features used for the classification;

universality, i.e., the practical aspects of optimal identification/authentication construction under the lack of statistics about input source distribution and channel distortions including geometrical desynchronization.

The above requirements are quite close to a robust perceptual one-way hash function [8,9]. However, in the scope of this invention we will advocate a different more general approach where the robust perceptual hashing can be considered as a particular case. This approach is based on the secure low-complexity multiple hypothesis testing in the secret domain defined by the key. This approach is also efficient in terms of memory storage requirements and universal in terms of priors about the source distribution.

Microstructures and Randomness

The possibility of identification and authentication of products, documents, objects and articles by analyzing difficult-to-duplicate, heterogeneous/inhomogeneous or "random" microstructure associated to the genuine item has been investigated in various contexts. The microstructures have a random character and are unique for all items. The random pattern of microstructure is highly determined by the physical properties of materials (paper, metal, plastic, etc.) and the method of data acquisition. The methods of acquisition should be considered in the broad sense and include optical, acoustic, mechanical, electro-magnetic and other principles. However, in the scope of this invention we will focus on the optical techniques due to the wide distribution of cheap and highly-performant cameras and their presence in the most of scanners, mobile phones, PDAs and webcams that makes the acquisition cheap and available for virtually any person. The optical techniques used for the acquisition of microstructures can be divided on groups depending on the use of coherent or incoherent light, reflected or transmitted light, 2D (planar) or 3D (volumetric) imaging and light spectral band (visible, IR or UV). In fact it is possible to use any device being able to reproduce the randomness.

The coherent light acquisition assumes the presence of the synchronized source of light that is generally archived using lasers. It allows forming a so-called speckle pattern of microstructures. However, the need of lasers requires the design of special devices that seriously restricts their use in portable devices. That is why we will consider only incoherent regime that is achieved by observing the object under the normal daylight conditions.

The reflected light imaging is typically used in the simple setups when the object surface reflects the incident light and the imaging device registers the reflected light. The transmitted light imaging refers to the case when the incident light is registered on the opposite side of the item by the imaging device. Technologically, both modes can be used in practice. However, the transmitted light imaging can be used only with optically transparent or semi-transparent items or using special wavelengths such as IR or x-ray.

The 3D acquisition is generally more informative compared to the 2D case. However, it requires more complex equipment including coherent sources of excitation and transparency of items. Additionally, 3D imaging needs more memory for storage and transmission bandwidth. For the portable communication devices, the MMS messaging is already a commonly supported standard. Therefore, to enable the fast introduction and distribution of the proposed technology, we will focus on 2D imaging. However, it should be pointed out that the proposed methods can be also successfully used with the existing 3D imaging technologies.

Finally, the spectrum in which microstructure image is acquired is also quite broad and includes visible, IR, UV, millimeter and x-ray bands. In principle, the modern CCD and CMOS arrays are tuned to have the best sensitivity for the optical band. However, some arrays have also acceptable sensitivity in the IR band simultaneously. Therefore, both visible and IR bands can be used at the same time.

The examples of natural randomness are numerous and we will consider the most typical and indicative ones. J. Brosow and E. Furugard described the usage of random imperfections in or on the base materials of objects for authentication purposes [10]. The device that converts the imperfection associated to the object into binary code is also described. A similar possibility of using a distinguishing physical or chemical characteristic of an article was disclosed in [11]. As the distinguishing characteristic, the invention proposed to consider the micro-topography of the article surface. The multiview scanning under different illumination angles was described. The micro-topography characteristics were observed in the reflected and transition modes for different wavelengths and different registration methods for various materials including metal, wood, organic materials, living cells, crystals and gemstones, etc. The targeted application concerned an article authentication where the feature vector was extracted from the image with the subtracted mean or from the image obtained under the different viewing conditions. The redundancy reduction was applied to produce about 900 features that are asymmetrically encrypted and encoded for the reproduction in the form of a barcode on the article surface. At the authentication stage, the features extracted from the surface of the article to be authenticated are compared with those extracted from the printed barcode to deduce the decision about the authenticity based on a cross-correlation score. The disclosed method uses the intrinsic synchronization due to the precise article placement and graphical designs. The authentication can be performed using typical scanner modified to ensure illumination at different angles. A similar approach was also disclosed in the invention of Thales [12] and the serious of patents from Ingenia Technology [13-16], where the coherent radiation and microscope were used for the microstructure registration in visible, IR and UV bands. Besides a similar approach to the article authentication, the above inventions also describe the identification of items mostly referring to paper and cardboard articles. Similarly to the previous approach about 500 features are extracted from the microstructure image using various techniques including image downsampling to form a digital signature that is stored in the database jointly with the entire image for further visual expectation. The identification is performed by the exhaustive search in the entire database using the cross-correlation of the extracted signatures with those stored in the database. Similarly to the previous invention, the features are extracted without imposing any constraints on the security. One more invention describing the coherent acquisition of microstructure images was suggested by De La Rue [17]. Similar invention based on the optical microscope acquisition was proposed in [18], which proposes acquiring the image of a small area of the article to be protected such as painting, sculpture, stamp, gem or specific document. The forensic analysis of added features such as grain structure of toner particles was described in [19].

The technique for the article authentication and identification was also described in the inventions patented by the Escher Group [20-26]. Two last inventions refer to the three-dimensional structures while the rest of the applications describe the planar (two-dimensional) ones. The microstructure of article surface is considered as a unique link between the article and the database that can be used for various security applications including tracking and tracing as well as document management systems. Similarly to the previously considered inventions, the decisions about the authenticity and the identification are based on the cross-correlation score obtained from the extracted features deduced from the microstructure data using dedicated scanning device. The added template and graphical design are used for the synchronization. In the paper [27] of the same authors, the performance analysis was performed under Gaussian assumptions about the statistics of microstructures and noise that is also far from being realistic. For the large databases, the normalized cross-correlation is not also feasible approach.

The further extension of these approaches was accomplished in the inventions of Fuji Xerox Co. and Alpvision where mostly the article identification was disclosed. The Fuji Xerox invention [28] describes the architecture and means for document verification based on nonreproducible features extracted and stored on the secure server at the enrollment stage. At the verification stage the extracted features are matched with those stored on the server using normalized cross-correlation as a measure of match score. The feature information is considered to be at least one of information indicating a scattering state of an image forming material for both the reflected and transmitted through lights. The similar invention of Alpvision [29] investigates the microstructures of different surfaces under various scanning resolutions in non-coherent light with the explicit synchronization for a given matching metric considered to be again the cross-correlation score. The matching is applied either to the compressed or downsampled images of microstructures to accelerate the matching process. Additionally, contrarily to the previous inventions where the matching was performed over the entire database as a form of the exhaustive search, the invention of Alpvision advocates a tree-based search with the tree clustering based on the downsampled images. A particular method of rotation compensation prior to the cross-correlation is presented based on angular unwarping of image spectrum. The memory storage requirements remain quite high for the considered scanning resolutions and the number of cross-correlations is too large even in the considered tree-search approach for the large number of entries. The storage of the scanned images in the direct non-protected compressed form also raises serious security concerns. Similar tree search based on the hierarchical multiresolution data clustering was proposed in the application of David Sarnoff Research Center. Inc. [30] and the cross-correlation matching was advocated in [31].

Keeping in mind the security concerns, the techniques based on physical one-way functions should represent a reasonable alternative to the above approaches. The physical one-way functions are a sort of a physical analog of cryptosystems and try to mimic the cryptographic hashing functions. For example, P. S. Ravikanth [32] describes such a one-way function for the there-dimensional probe authentications in the coherent light. The speckle image is decomposed into multiresolution representation using Gabor transform, where the robust features have been extracted to form a 2400 bit hash.

Being known and well recommended in the laboratory conditions, the natural randomness identification/authentication has not unfortunately become a common technique in practice. Among the main reasons that seriously restricted its usage was the need to use a special device for the acquisition. Under these circumstances, all advantages of unclonable microstructures have been reduced to almost proprietary usage. Being acceptable for the laboratory examinations, it is not however the solution for the ordinary people when the identification and authentication should be performed quickly, at any time, without special devices, extra training and cost. Additionally, the need for the secure storage of the database and the disclosure of publicly extracted features used for the identification/authentication raises the serious concerns for the security aspects of such systems.

BRIEF SUMMARY OF THE INVENTION

The invention described in the current document is a method and apparatus for secure and reliable identification and authentication of products, items, objects and packaging using unique unclonable microstructure features created by either nature or humans. In this proposal, the uninvertible representation of random microstructure is computed and stored in the database in the memory-efficient and secure form. For the further authentication purposes, the complementary index is derived that is attached to the item needed to be authenticated. At the identification stage, the image of surface microstructure is acquired and the decision about the item identification index is deduced applying robust and fast decision procedure in the secure domain. At the authentication stage, the decision about item authenticity is made using the complementary index attached to the item and the decision procedure fusing this index with the image of item surface microstructure considered as side information.

The proposed solution is simple and low-cost and trade-offs the above robustness, security, complexity, memory storage and universality requirements. The system of the invention can use a public portable device such as for example a mobile phone equipped by VGA resolution camera or higher that is in the possession of majority of the users worldwide. Such a broad distribution of verification devices creates an unprecedented situation when a global smart network is established by the users themselves and each item can be checked out, tracked and traced worldwide. The results can be registered at the central server and the job of counterfeiters, who previously benefited from the unawareness of the customers and manufacturers, will be considerably complicated. To enhance the details of microstructures we will use simple macrolenses that are available in many shops or by Internet. These macrolenses could be integrated directly into the mobile phones or simply added to the items and packaging.

Therefore, the major advantages of the proposed invention can be summarized as follows:

Security:

The storage of the item surface images (fingerprints), their compressed versions or features in open or even encrypted form (with the need of prior decryption before identification/authentication) is not secure. The disclosure of the database might lead to the attempts of reverse engineering and creation of faked fingerprints (these attempts in biometrical fingerprint applications are well known [33]. At the same time, possessing the discriminative features extracted from the surface microstructure images, the attacker can deduce the information about the decision regions of identification/authentication procedures using a so-called sensitivity attack. The present invention avoids these possibilities using non-invertible one-way cryptographic like mapping of the original item surface image into binary or real numbers that represent the relative relationships between the vectors in the secure key-defined domain.

Memory Storage:

The direct storage of the acquired samples requires $M'N_1'N_2'P$ bits, where M is the number of entries in the database, $N_1$, $N_2$ are the dimensionality of the image in pixels, and P is the number of bits per pixels. The use of the advanced wavelet-based compression algorithms might help reduce this number by about 100-150 times. For example, the scanning of 0.5 mm×0.5 mm image with the resolution 2400 dpi would require about 100 Gbytes assuming compression of 1:100 for the database of 10 million entries. The applied compression is obviously lossy that impacts image quality and might seriously decrease the accuracy of verification procedures. This even though the storage and distribution of 100 Gbytes is not very practical for the majority of portable devices such as mobile phones, PDAs, etc. Moreover, taking into account the increase of the number of entries to hundreds or thousands of millions for one article and assuming the existence of several different articles or different manufacturers offering the same verification services it becomes a serious restriction for the flexible verification protocols. The present invention is free from the above drawbacks due to the entirely different philosophy behind the proposed verification procedures that include identification, authentication, tracking and tracing. The proposed invention requires the storage of the reference distances or a sort of robust hash with at most M×L bits, where L is the length of the binary hash value. For examples, for 10 million-entry database and 25 bit hash, it would require about 31 Mbytes that can be easily handled by most of currently available memory cards and communication protocols.

Complexity:

The time for the search in the database for the best match with a given sample for the identification purposes using cross-correlation techniques is characterized by the complexity $O(M)$. One can also assume that the cross-correlation is computed efficiently using fast Fourier transform (FFT) on the reduced size or compressed images (the compression is applied to cope with the memory storage requirements) that has the complexity $O(N' \log(N'))$, where N' is the reduced size of N. Here, one should also take into account the time of decompression that for the large M might be a serious restriction. One can overcome the above problem using a well-balanced state-of-the-art tree-search, which requires about $O(\log(M))$ computations. However, for the best known alternative kd-tree [34] this excellent behavior is usually only realized when the sample points in the feature space are dense, i.e., $M \gg 2^N$. For example, for 10 million entry database with $N=1000 \times 1000$ images this condition does not hold. The present invention further enhances the efficiency of the search procedures for the identification purposes by creating specially structured databases (codebooks) from the acquired surface images and computing the relative distances to the reference codewords generated or selected based on the secret key in one part of invention or creating short string binary representations that can be efficiently used as the direct pointers to the database entries for the identification and authentication purposes. The fact that the samples are not stored in the database directly additionally enhances the security level of the whole system. The way to handle the secrete key generation itself can be performed according to known procedures. The main point is that the transformation used it is not a public one and it can be available only to the authorized users/services.

Reliability and Verification Accuracy:

The attempts to reduce the size of the acquired samples by compression, downsampling, specific feature extractions applied to cope with the complexity of the search and memory storage requirements will unavoidably lead to the drop in the performance with respect to the identification/authentication accuracy. To demonstrate it, assume that the Chernoff bound on the average probability of error for the binary verification $P_e \leq e^{-ND(p_0, p_1)}$ [35,36] is used for the performance evaluation of identification procedure with $p_0$, $p_1$ are the distributions for two hypothesis and $D(p_0, p_1)$ denotes the Chernoff distance. If one applies a many-to-one mapping to the data (compression with quantization, downsampling, etc.) that produces new distributions $\tilde{p}_0$, $\tilde{p}_1$, this reduces the Chernoff $D(p_0, p_1) \geq D(\tilde{p}_0, \tilde{p}_1)$. The reduction of the Chernoff distance will considerably increase the probability of error and thus reduce the identification accuracy. The equality is only possible under invertible transforms that are a part of the present invention in the secure domain assuming the availability of granted access rights. Similar results are valid for the authentication and can be extended to the other metrics of signal similarity. The present invention describes such transformations that either preserve or insignificantly reduce the distance or can be invertible under the specific constraints on the class of microstructure images for the granted access right holders. Moreover, the reliability and verification accuracy can be significantly improved using decision or bit correctness extraction test considered in this invention. This is possible due to the fact that the decision reliability is directly related to the relationship between the data to be projected and the basis functions of proposed transformations.

Universality:

The majority of known solutions is quite sensitive to the change of the acquisition conditions and requires specially designed synchronization. The synchronization is mostly based on either the addition of specially designed templates/symbologies or usage of already existing ones such as logos, barcodes, etc. (intrinsic templates). This considerably restricts the applications of these techniques that might change the item look or require redesigning the algorithm for each new item. The proposed invention is free from these drawbacks due to the entirely different concept behind the authentication/authentication rules that do not need explicit perfect synchronization prior to the decision-making. Moreover, the identification/authentication can be performed using any available scanners or portable devices.

The present invention principally targets any goods, physical objects or materials, needed to be protected against counterfeiting. The invention can be applied to (but is not limited to) the following applications: anti-counterfeiting, brand protection, objects of art, tracking, tracing, quality and integrity control, market study, product promotion and lotteries. Targeted products and goods include (but are not limited by) various luxury goods (watches, jewelry, cigarettes, alcohol, clothing and footwear etc.), pharmaceutical products, consumer or household products, various electronic and mechanic equipment or some of its components, as well as labels, tags, packaging, boxes, shipping invoices and various printed documents associated with the product that are used for the authentication or certification. The authentication information can be reproduced by various printing technologies such as ink-jet, solid-ink, laser-, intaglio-, letterpress-, offset-, screen-, gravure-flexo-graphic printing or coating techniques.

Figure 1:
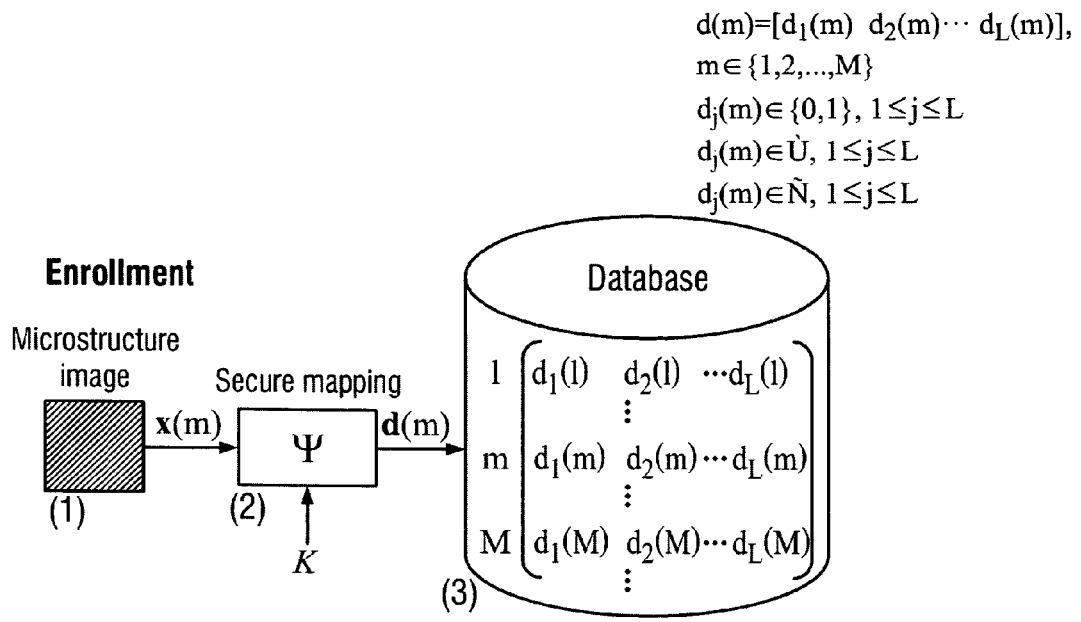
FIG. 1: An embodiment for the enrollment part of the proposed system of item authentication/identification using unique unclonable microstructure features created by either the nature or humans. An image of surface microstructure $x(m)$ (1) of an item acquired, which is supposed to be of dimensionality $N=N_1 \times N_2$, during the manufacturing process by a camera operating at VGA or higher resolution that is compatible with optical properties of typical portable devices (mobile phone, Pocket PC, Smartphone, PDA, Palm, etc.) or web cameras is acting as an input to a secure key dependent (K) one-way mapping $\Psi$ (2). One-way mapping property indicates a computational unfeasibility to perform the recovery of the input without the key and given the output faster than exponential or super polynomial complexity. The obtained mapping output $d(m)$, which is an L-dimensional vector $(d(m)=[d_1(m), d_2(m), \ldots, d_L(m)])$ of binary $(d_j(m) \in \{0,1\}, 1 \leq j \leq L)$, integer $(d_j(m) \in Z, 1 \leq j \leq L)$ or real numbers ($d_i(m) \in P$, $1 \leq i \leq L$), can be considered as a hash or uninvertable representation of random microstructures, and is stored in a database (3).

1≤i≤L+1, where are the transformed input image coefficients represented in the corresponding sectors that are transferred to a block of binary or M-ary decision (29). The outputs of this block $d_j$, 1≤j≤L, are used to produce the final index d (30) by means of their concatenation, composition or any other unique combination.

FIG. 13: An example of acquisition of an image of surface microstructure of an item (31) by a camera of a customer/service portable device (mobile phone, Pocket PC, Smartphone, PDA, Palm, special reader etc.) in VGA or higher resolution compatible with optical properties used by the manufacturer on the enrollment stage and a macrolense attached to this device. A portable device (32) is equipped by an embedded digital camera and a macrolense (33) synchronously attached to a surface of the device in a way to enhance a total magnification. Finally, a microstructure is acquired by making photo of a surface of an item located in a focal plane of this compound optical system.

FIG. 14: An example of acquisition of an image of surface microstructure of an item (31) by a camera of a customer/service portable device with the resolution compatible with optical properties used by the manufacturer on the enrollment stage and a macrolense attached to an item surface. An item (31) with a macrolense (34) attached to or embedded into its surface is placed in front of a digital camera of a mentioned portable device. Similarly to the case described in FIG. 13, the main goal of using a macrolense (34) is to enhance the magnification properties of the optical system of a portable device embedded camera. A photo of microstructure is acquired by making photo of a surface of an item located in a focal plane of this compound optical system.

FIG. 15: An example of synchronization for the microstructure surface image of an item by a camera of a portable device with possibly attached macrolense. The transparent protection layer or packaging (35) is applied on the top of the item surface (30). The synchronization pattern of any suitable configuration capable to recover from affine or possibly projective transformations is integrated into the structure of protection layer or packaging (35) using printing, laser engraving, painting, coating, gluing, stamping, etc. In this particular example, the synchronization pattern is in a shape of a square with one corner marked with a small filled square allowing resolving a rotation ambiguity. The removal of the transparent protection layer or packaging due to the item opening or use also removes the synchronization mechanism thus making impossible or very hard to find the synchronization with the surface image. This will also serve as an indication of item damaged integrity.

FIG. 16: An example of a joint synchronization and optical magnification of an image of surface microstructure of an item by a camera of a customer/service portable device (mobile phone, Pocket PC, Smartphone, PDA, Palm, etc.) and a macrolense integrated into the transparent protection layer or packaging. In the current acquisition protocol configuration that is robust to a class of affine/projective distortions, a synchronization pattern (36) is overlaid with a macrolense (35) serving to protect the pattern as well as to enhance the overall optical properties of the portable device embedded camera.

FIG. 17: An example of a joint synchronization and optical magnification of an image of surface microstructure of item by a camera of a customer/service portable device (mobile phone, Pocket PC, Smartphone, PDA, Palm, etc.) with a pattern integrated in its body. In the current acquisition protocol configuration that is robust to a class of affine/projective distortions, a synchronization pattern (36) is embedded into a surface of an item (30) by mechanical, chemical or any other impact on this surface, and covered by a macrolense (37) serving to protect the pattern as well as to enhance the overall optical properties of the acquisition process. The relief of the created crater in the item surface serves as a microstructure surface.

FIG. 18: An example of a self-synchronization of acquisition of an image of surface microstructure of an item printed using an ordered halftone by a camera of a customer/service portable device (mobile phone, Pocket PC, Smartphone, PDA, Palm, etc.). A halftone image (38) is printed over a surface of microstructure using a specific periodic structure. Due to this type of ordered halftone, its magnitude Fourier spectrum (39) has periodic peaks (the first detected peaks are marked by white circles). An affine transformation of this microstructure image (rotation in the case of (40)) during a customer acquisition is reflected by the corresponding modifications of the magnitude Fourier spectrum (rotation in the case of (41), marked by white circles). Such a phenomenon allows using the maximum likelihood estimation strategy of the parameters of the applied affine transform for its following inversion and resynchronization. The microstructure of the printed halftone image can also serve as a microstructure image.

Figure 10:
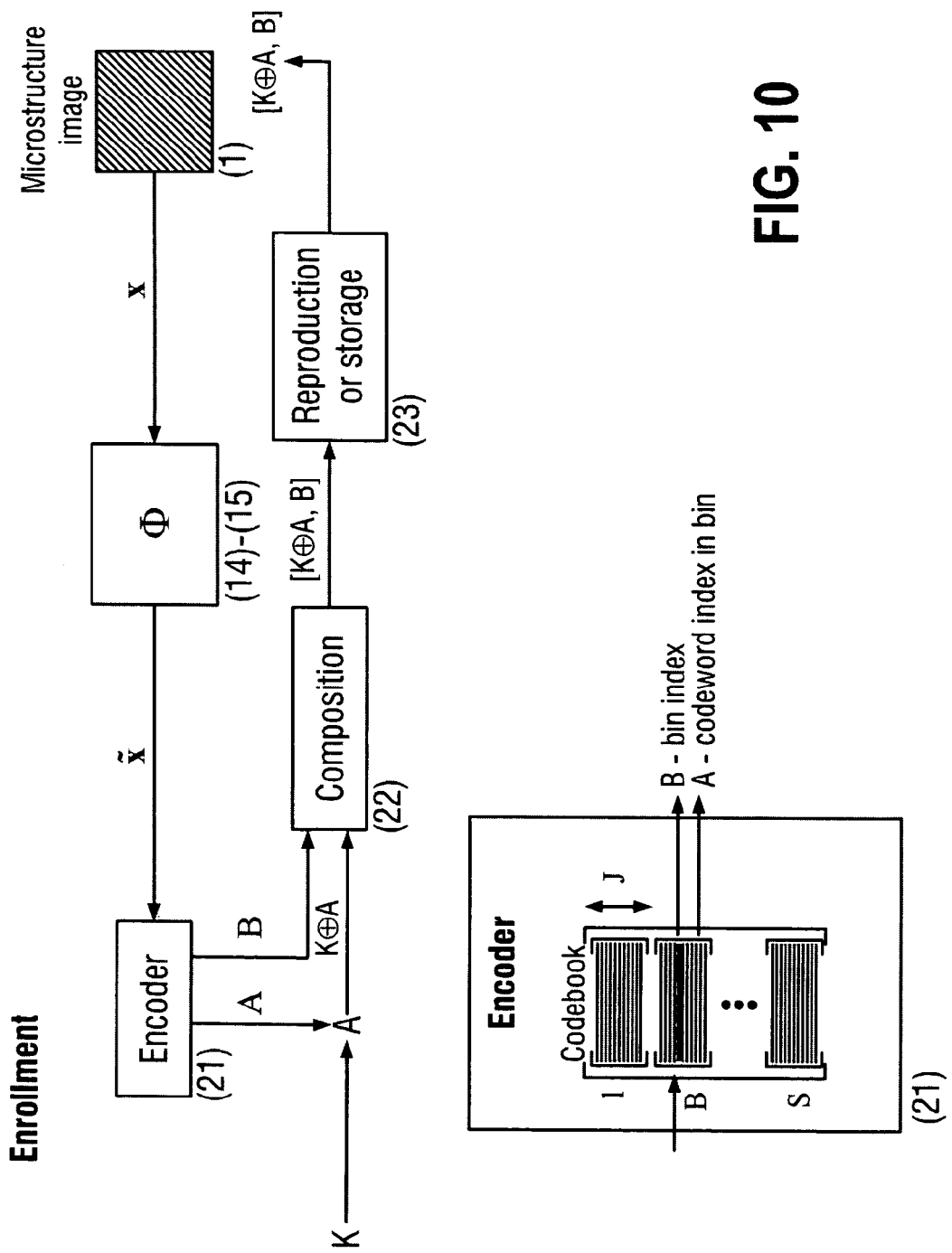
FIG. 10: An embodiment for the enrollment part of the proposed system of an item authentication using unique unclonable microstructure features created by either the nature or humans based on distributed coding framework and secure projections. An image of surface microstructure x(m) (1) of an item acquired during the manufacturing process by a camera operating in VGA or higher resolution that is compatible with optical properties of typical portable devices (mobile phone, Pocket PC, Smartphone, PDA, Palm, etc.) (that is supposed to be a vector of dimensionality N) is first possibly transformed into $\tilde{x}(m)$ using transform $\Phi$ that can be either random projections (14-15) or reference codeword transform (6-7) and than passed to a distributed encoder (21). The encoder has the access to the codebook generated based on random binning strategy using distribution and dimensionality of the transform domain codewords. It means that the codewords are randomly distributed among S bins roughly by J sequences in every bin. Then given the input $\tilde{x}(m)$, the encoder is looking into this codebook and produces an index pair A and B, where B stays for the bin where the codeword corresponding to x̃(m) is stored and A indicates the index of this codeword in the $B^{th}$ bin. Furthermore, the index A is encrypted using a one-time pad with a secret key K. On the next stage, B and K⊕A are passed to the composition (22), where the final vector [B,K⊕A] is obtained by concatenation or any other lossless combination of pure and encrypted indexes B and K⊕A, respectively. It is also possible to encrypt the index B and to compute the hash from A instead of encryption. The output of (22) is used for reproduction on a surface of an item or storage in a database according to (23).
Figure 11:
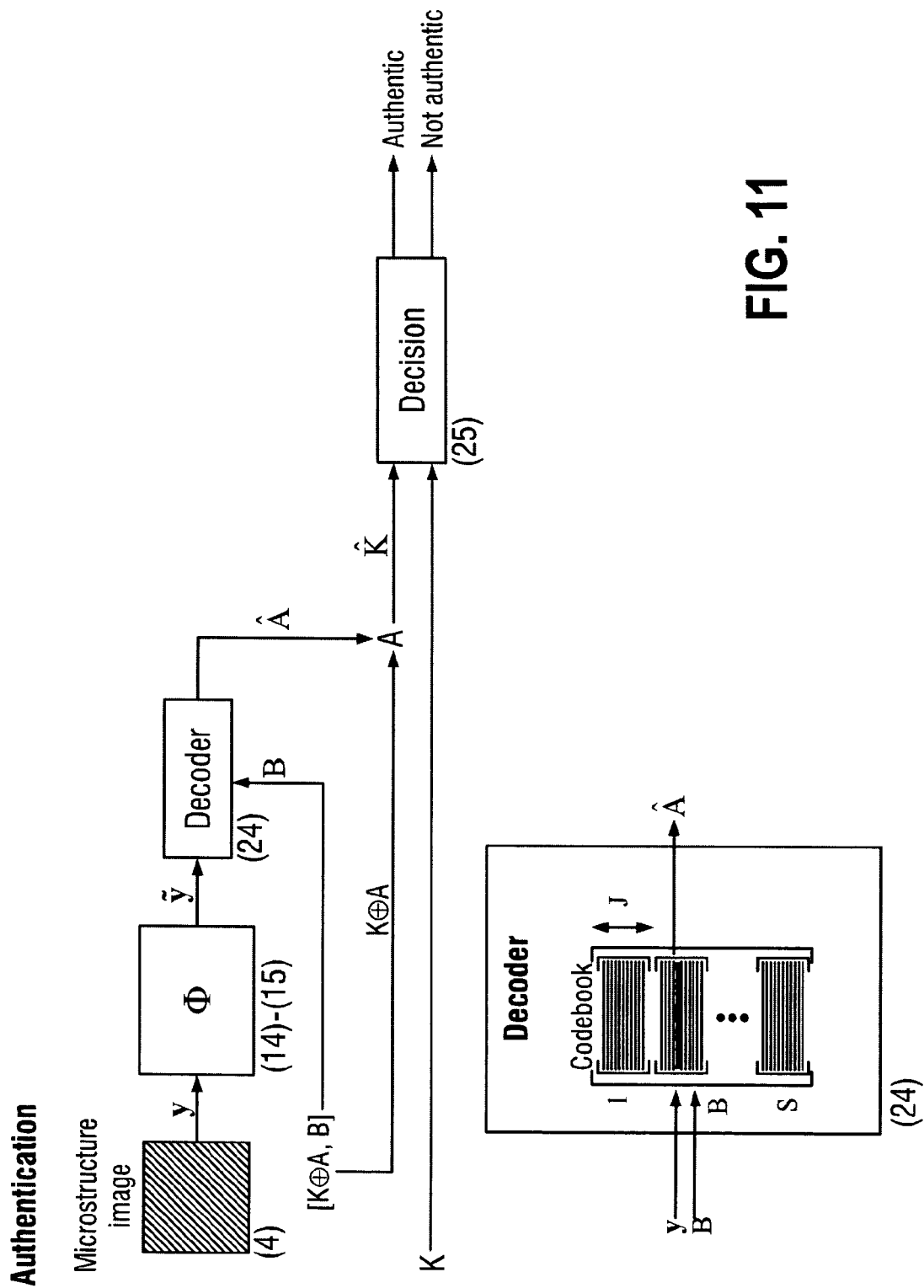
FIG. 11: An embodiment for the authentication part of the proposed system of items authentication using unique unclonable microstructure features created by either the nature or humans based on distributed coding framework. An image of surface microstructure y (4) of an item extracted from an open environment of goods and product circulation is acquired by a camera of a customer/service user portable device (mobile phone, Pocket PC, Smartphone, PDA, Palm, etc.) in VGA or higher resolution compatible with optical properties used by the manufacturer on the enrollment stage (FIG. 10) is possibly transformed into ŷ using transform Φ described in FIG. 10 and given as an input to a distributed decoder (24). At this stage, the estimate of the index A, Â, is produced using ŷ and a side information B available from presented on an item surface combined index [B,K⊕A]. The obtained result Â is used for deducing the estimate of the secret key via its one-time pad with [K⊕A]. The estimate K̂ is compared with the original key K in the decision block (25). It is also possible to compare the hashed version of A from the enrollment stage and deduced hash from the estimate Â. In the case the comparison result satisfies a certain decision making constraint in terms of Hamming or normalized Hamming distance or any other distance metric an item is declared authentic. In the opposite case, its authenticity is rejected.
Figure 19:
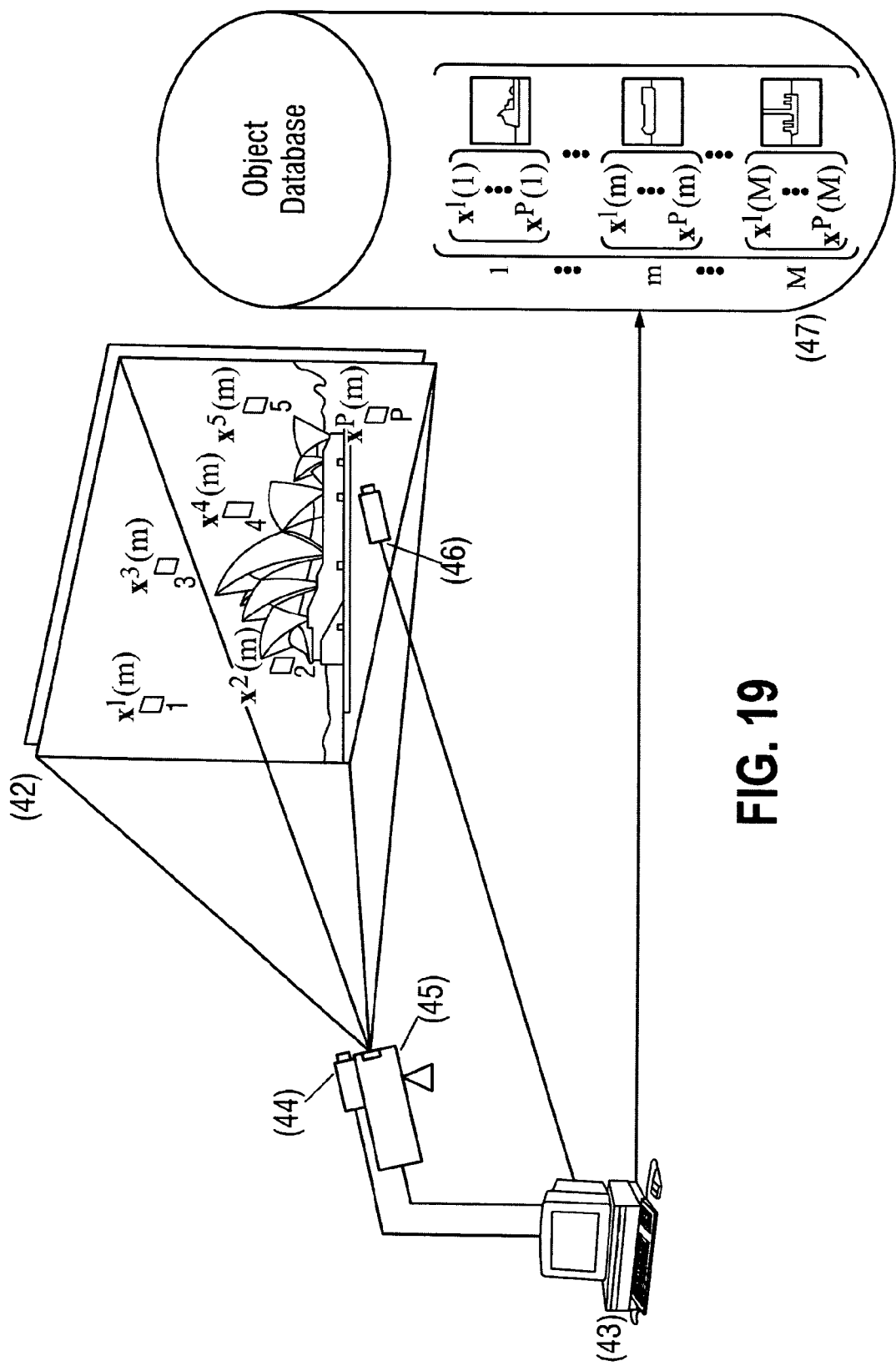

FIG. 19: An embodiment for the enrollment stage of the proposed system of artworks authentication using unique unclonable microstructure features. A particular artwork (42) that can be any object of art is synchronized with the internal reference coordinate system using a digital camera (44) and projector (45) with a random mask generator connected to a personal computer (43) equipped by a camera (46) operating in VGA or higher resolution. The joint role of (44) and (45) is to synchronously highlight randomly selected areas $x^i(m)$, $1 \le i \le P$, of a predefined dimensionality using secret key. Being highlighted, these areas are acquired by the device (camera with macrolenses, microscope, etc.) (46) and the acquisition output with a unique link to the artwork is stored in an object database (47). The authentication consists in the matching of the features extracted from regions $x^i(m)$ highlighted by the beamer after synchronization with those stored in the database (47). A particular authentication procedure can be accomplished as shown in FIGS. 10 and 11.

Figure 20:
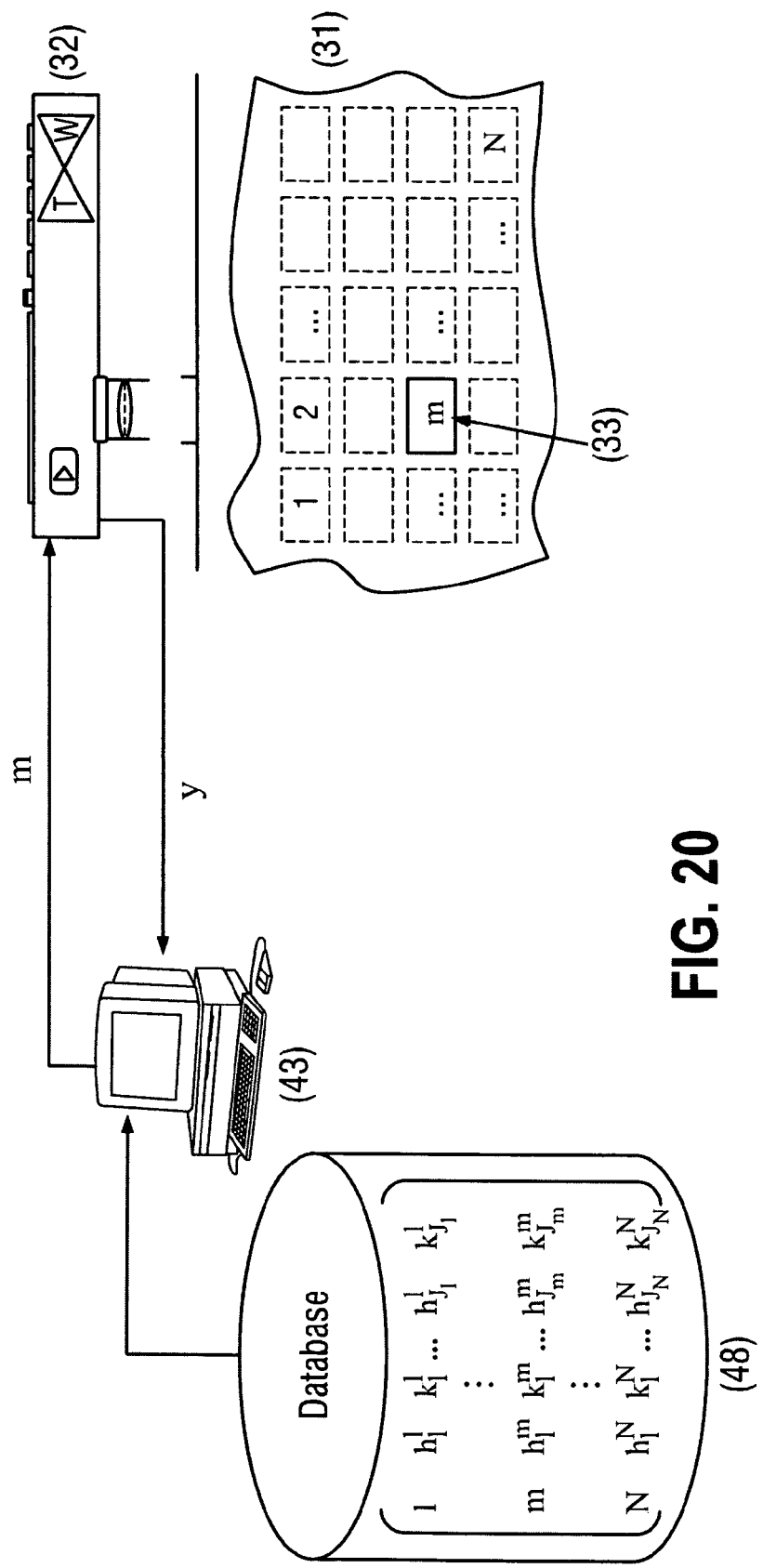

FIG. 20: An embodiment of the proposed system of item identification and key extraction using unique unclonable microstructure features. Before item identification, a server sends a challenge m that defines an area of an item surface microstructure (33) that is acquired by a camera of a customer portable device (32). The acquisition result y is sent back to the server. The server computes a physical unclonable function h' based on y and is searching in the $m^{th}$ bin of the database (48) for all $h_i^m$, $1 \le i \le J_m$, that are close to h' in some sense (Euclidian distance, Levenstein distance, variance, etc.). In the case a unique such $h_i^m$, $1 \le i \le J_m$, is found, its index i is declared as an item identity. The database (48) contains as well secret keys $k_i^m$, $1 \le i \le J_m$, that have a one-to-one correspondence with $h_i^m$, $1 \le i \le J_m$, and depending on the customer needs can be sent to the device (32). In this case, the pair $h_i^m$, $k_i^m$, $1 \le i \le J_m$, after transmission to the customer is marked as a used one and will not be exploited any more.

DETAILED DESCRIPTION OF THE PREFERRED EMBODIMENT(S)

The invention proposes a novel protocol for secure identification and authentication of various items using unclonable features. The protocol acts in two modes, identity verification and authenticity verification. Both modes are implemented based on unique unclonable features of item surfaces that either have a natural origin or artificially produced by humans by printing, laser engraving, coating, gluing, sticking, painting, stamping, embedding, light exposition, heating, current passing, potential charging or any other forms of radiation or physical impact, etc. Due to the unfeasibility of their copying and reproduction, these features can be used as secure item identification/authentication codes as well as inputs for generation of such codes or secure keys extracted from the natural randomness. The second distinctive feature of the invention is the mobile platform in sense that item identification/authentication is performed based on typical mobile phones, Pocket PCs, Smartphones, PDAs, Palms, etc. (hereafter, portable devices) although use of classical scanners, cameras or microscopes in the invented protocol is as well possible. Independently of the way the secure code is produced (natural or artificial) on the object surface it is acquired by camera of a portable device and is communicated to a secure server by means of MMS, e-mail, Bluetooth, Internet or any other possible communication means. Depending on the way secure codes are stored on the server (microstructures are used as these codes or are considered as inputs for their generation), a comparison of the acquired data with the content of a secure database is performed. The database is organized in two different ways depending on the identification or authentication application. The final decision about the match allows to confirm/reject the item authenticity or to establish its identity.

Item Identification

Figure 2:
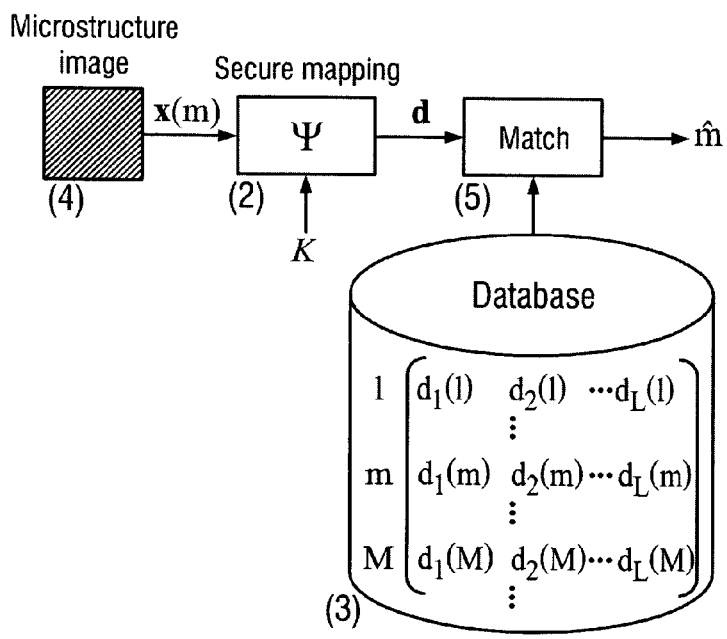
FIG. 2: An embodiment for the identification part of the proposed system of item authentication/identification using unique unclonable microstructure features created by either the nature or humans. An image of surface microstructure y (4) of an item extracted from the disclosed area is acquired by a camera of a customer/service user portable device (mobile phone, Pocket PC, Smartphone, PDA, Palm, portable verification device etc.) at VGA or higher resolution compatible with optical properties used by the manufacturer at the enrollment stage (FIG. 1), which is supposed to be considered as a vector of dimensionality N, is acting as an input of a secure key dependent (K) one-way mapping $\Psi$ (2). The obtained mapping output d, which is a L-dimensional vector ($d(m)=[d_1(m), d_2(m), \ldots d_L(m)]$) of binary ($d_j(m) \in \{0,1\}$, $1 \leq j \leq L$), integer ($d_j(m) \in Z$, $1 \leq j \leq L$) or real numbers ($d_j(m) \in \{0,1\}$, $1 \leq j \leq L$), is passed to the match stage (5) where a closeness between d and database (3) entries d(i), $1 \leq i \leq M$, is verified with respect to a particular criterion (minimum distance, minimum variance, minimum divergence, etc.) that establishes the distance between vectors, distributions or any functions of item including moments and characteristic functions in arbitrary specified domain and the index $\hat{m}$ of the hash $d_{\hat{m}}$ that minimizes this criterion is declared as an item identifier. It is possible that several closest results are declared as the list of the output identification. In the case none out of M database entries satisfies the criterion, the identity of an item is not established that is declared in the proper form to the requesting party.

According to the invention, the protocol of item identification based on its surface microstructure as input for secure identification code includes two stages, enrollment and identification (FIG. 1-2). The block diagram presented in FIG. 1 refers to the generic principle of such codes construction. It is foreseen in this case that an item surface microstructure x(m) (1) at a specified position is acquired by a special device whose optical properties are compatible with camera of identification device. The obtained data are then securely (based on the secret key K) mapped using transform $\Psi$ (2) into a codeword d(m) stored in a secure database (3). The mapping is considered to be one-way meaning that given its output it is unfeasible to obtain the input in terms of number of required operations or computational time (that is supposed to be super-polynomial or exponential) without the knowledge of the key K. The general item identification framework is presented in FIG. 2. A customer portable device embedded camera captures an item surface microstructure (4). The produced output y is used to deduce the index assigned at the enrollment stage to this particular item via a secure mapping (2) that operates based on a symmetric secret key K. The produced mapping output d is matched in (5) with a database (3) and the matching output $\hat{m}$ (an index of the codeword that satisfies a certain criterion or distance rule constraint with the produced item codeword) is declared as the item identity. In the case no match is found the object identity is not confirmed. The key-dependent secure mapping $\Psi$ (2) can be accomplished using several different transformations based on linear, quadratic or more generally polynomial functions. We will consider two examples of such transformations based on linear and quadratic functions. A particular example of a linear transformation is random projection mapping and the quadratic one is a reference distance mapping. We will start with the more general case of quadratic mapping.

Reference Distance-Based Identification

Figure 3:
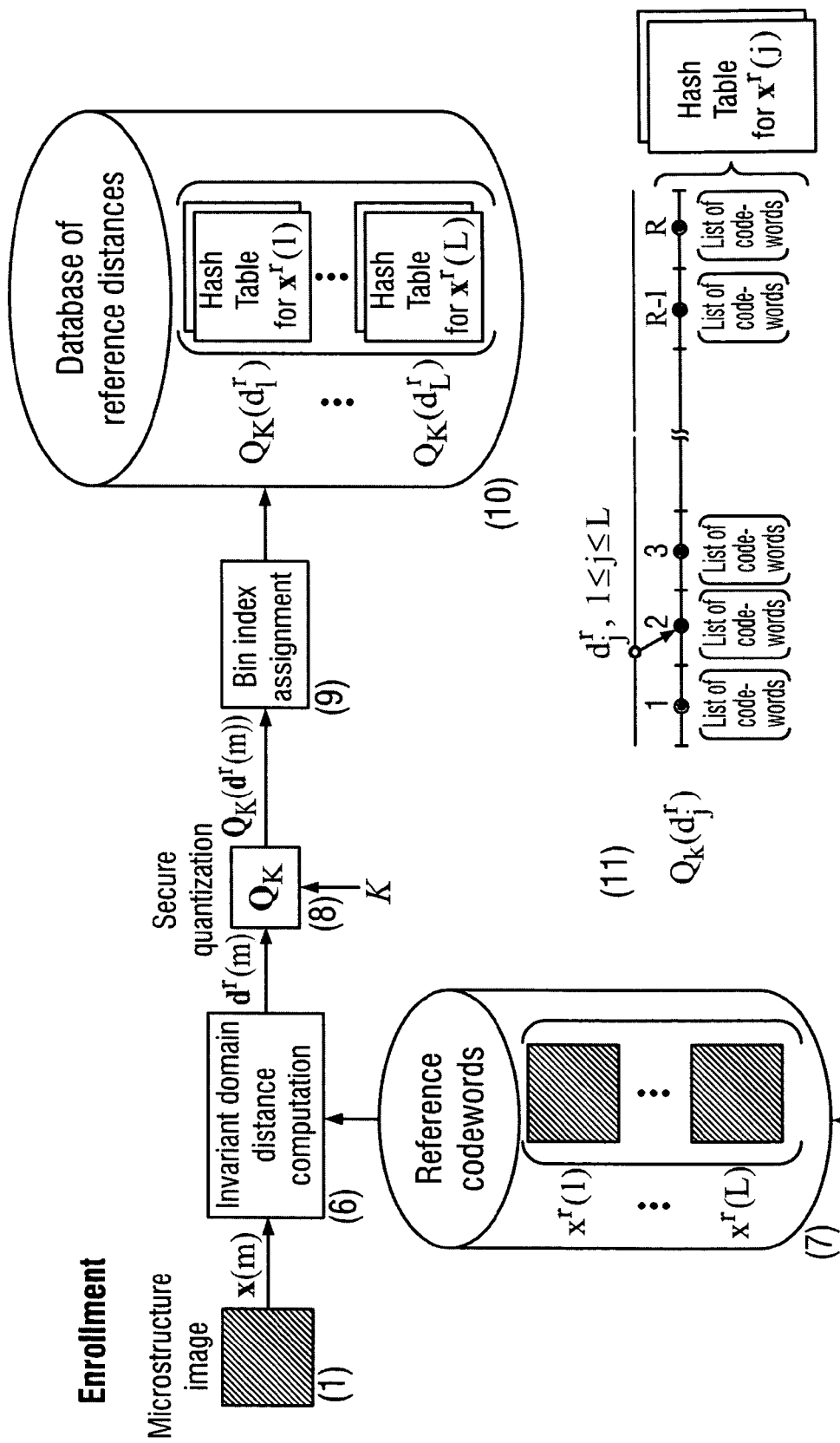
FIG. 3: An embodiment for the enrollment part of the proposed system of item identification/authentication using unique unclonable microstructure features created by either the nature or humans based on reference distances. An image of surface microstructure x(m) (1) of an item acquired during the manufacturing process by a camera operating at VGA or higher resolution that is compatible with optical properties of typical portable devices (mobile phone, Pocket PC, Smartphone, PDA, Palm, etc.) is an input to an invariant domain distance computation block (6). At this stage, the distance vector $d^r(m)$ between the acquired data x(m) (1) and a set of L reference codewords $x^r(j)$, $1 \leq j \leq L$, in a particular domain invariant to a certain type of malicious or non-malicious modifications (Fourier-Mellin transform domain, Radon transform domain, overcomplete domain, projective transform domain, etc.) related to imperfectness of the acquisition process or counterfighter/attacker malicious activity leading to the protocol desyncronization like rotation, translation, general affine transform, etc. is computed. The obtained L-dimensional vector $d^r(m)$ is securely quantized by a key dependent vector quantizer $Q_K(.)$ (8) that is composed of a set of scalar quantizers. The quantization output is passed to the bit index assignment (9), where the database of reference distances (10) is generated. This generation is performed according to the following strategy. A particular distance specified for some index $d_j^r(m)$, $1 \leq j \leq L$ (11), is quantized by a scalar quantizer $Q_K(.)$. The index of the corresponding bin indicates the look-up distance table to which the quantized distance codeword $d_j^r(m)$ is assigned. Thus, one can observe codeword grouping by the index of the corresponding bin. Being performed for all codewords in the given codebook, the resulting indexes of codeword groups for the specified reference system represent a sort of a hash table (HT). Finally, the database of reference distances is obtained by concatenation of respective HTs of $x^r(j)$, $1 \leq j \leq L$ for all indexes.
Figure 4:
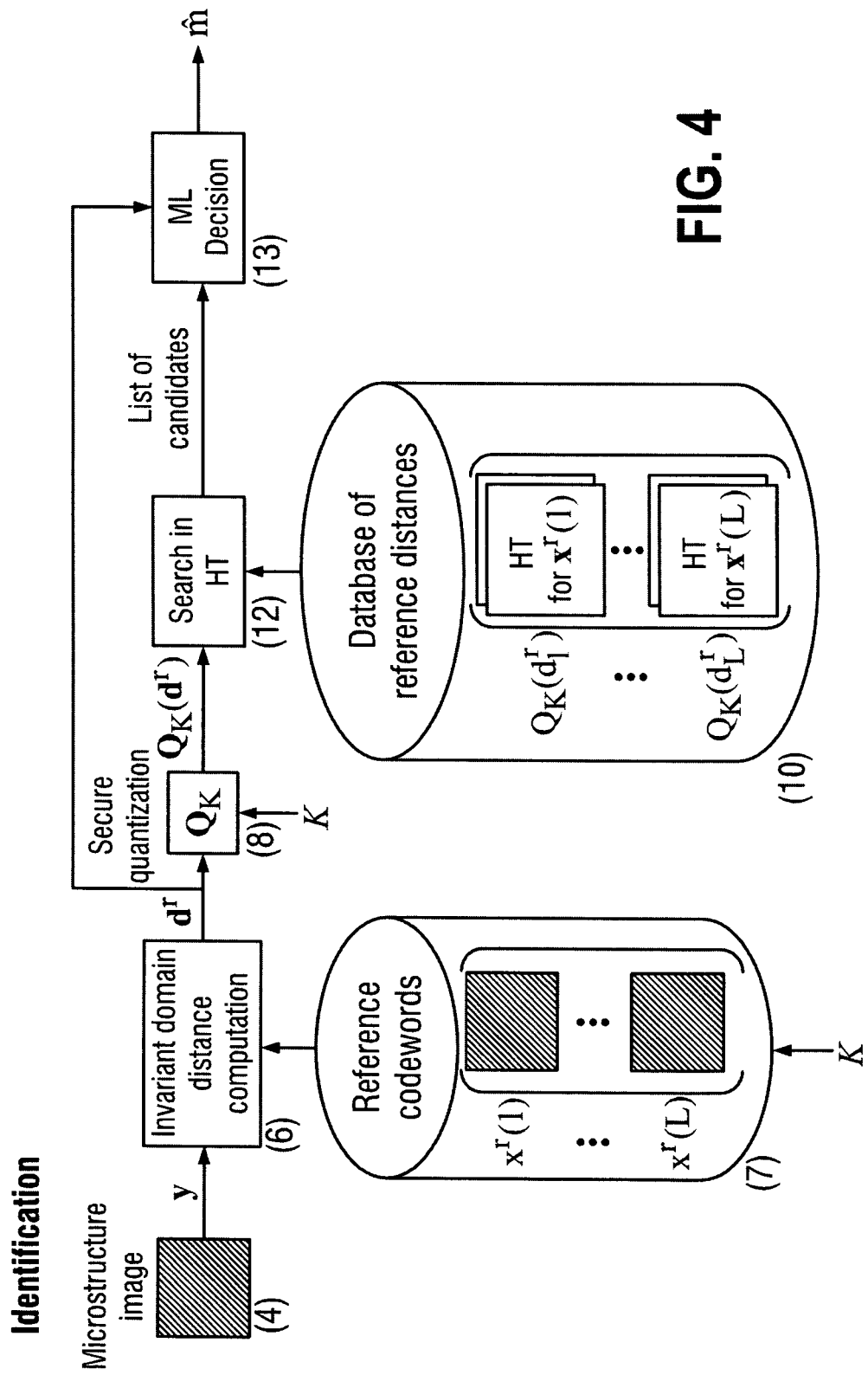
FIG. 4: An embodiment for the identification part of the proposed system of item identification/authentication using unique unclonable microstructure features created by either the nature or humans based on reference distances. An image of surface microstructure y (4) of an item extracted from an item is acquired by a camera of a customer/service portable device (mobile phone, Pocket PC, Smartphone, PDA, Palm, etc.) at VGA or higher resolution compatible with optical properties used by the manufacturer on the enrollment stage (FIG. 3) is an input to an invariant domain distance computation block (6). At this stage, the distance vector $d^r$ between the acquired data y (4) and a set of L reference codewords $x^r(j)$, $1 \leq j \leq L$, in a particular domain invariant to a certain type of malicious or non-malicious modifications related to imperfectness of the acquisition conditions or counterfighter/attacker activity leading to the protocol desyncronization like rotation, translation, general affine transform, etc. is computed. The obtained L-dimensional vector $d^r$ is securely quantized by a key dependent vector quantizer $Q_K(8)$ that is composed of a set of scalar quantizers. The quantization output (a hash index) is passed to a block of Search in hash tables (12). At this stage, where the requirements to the operational complexity are satisfied, the system in order to reduce the decision making search space cardinality generates a list of potential candidates by selecting from the database of reference distances (10) only those entries that satisfy a specific distance constraint with $d^r$ (in terms of quadratic or Hamming distance, variance or any other measures). This is accomplished by initially constraining the search space cardinality only by those distance look-up tables that correspond to quantization indexes of $d^r$. Final generation of the list of candidates is performed by selecting only those codewords from the previously restricted list that are the most likely (based on a majority voting or intersection principle). At the conclusive stage, the maximum likelihood (ML) decision (13) about the identity of an item is made using $d^r$ and the distances from the list of candidates. In the case, none out the final list of candidates will satisfy the decision criterion, the identity of an item is rejected. The modified ML also assumes the acceptance of multiple candidates for the item identity.

In the case of quadratic mapping, the complete cycle of item identification based on surface microstructure consists of two stages shown in FIG. 3-4. The enrollment (FIG. 3) starts from the acquisition of surface microstructure x(m) (1) and its key-based mapping to a set of invariant distances (6) with respect to the reference codewords $x^r(j)$, $1 \le j \le L$, that are used in order to satisfy a one-way property of the mapping $\Psi$ (2) enhancing in such a way security of the protocol and decreasing the complexity of identification. The obtained distances are than securely (based on a secret key) quantized using the quantizer $Q_K(.)$ (8). The role of quantization is twofold. First, a key-dependent character of this operation leads to an overall security enhancement of the protocol. Secondly, its result is used as an input of the bin index assignment (9) that produces the entries of the database of reference indexes (10) that has a structure of a set of hash tables. The idea behind the bin index assignment and hash table generation is the following. The computed reference distance with respect to a particular reference codeword $Q_K(d_j^r)$ is mapped by the secure quantizer into a certain quantization bin with a width defined by the acquisition conditions according to system (11). Simultaneously, the corresponding distance index is assigned to the list of codewords associated with this bin. Then, a hash table is formed as concatenation of reference lists of various bins for one reference codeword $x^r(j)$. A union of such tables obtained for all reference codewords provides the database of reference distances (10).

In this case, the enrollment stage is organized as it is presented in FIG. 3; the item identification follows the structure represented in FIG. 4. The item surface microstructure y (4) acquired by a customer portable device embedded camera (it is supposed that acquisition conditions at identification stage are compatible with those used during enrollment) is processed at the invariant distance computation block (6), where the vector of reference distances $d^r$ is produced, and securely quantized using quantizer $Q_K(.)$ exactly the same way as it is done during enrollment (FIG. 3). The output of quantization $Q_K(d^r)$ is used in the search block (12) to form a list of candidates that are those located in the corresponding reference codeword lists of hash tables (11) of the database (10). In this way additional reduction of the identification computational complexity is achieved. Finally, an identity index $\hat{m}$ is derived based on the invariance domain distance (6) output $d^r$ and the generated list of candidates via maximum likelihood decoding (13). If decoding fails finding a candidate that satisfies the imposed matching maximum likelihood decision constraint, the object identity is rejected. At the same time the modified rule can also decide the list of candidates with the maximum likelihood higher than a specified threshold.

Figure 5:
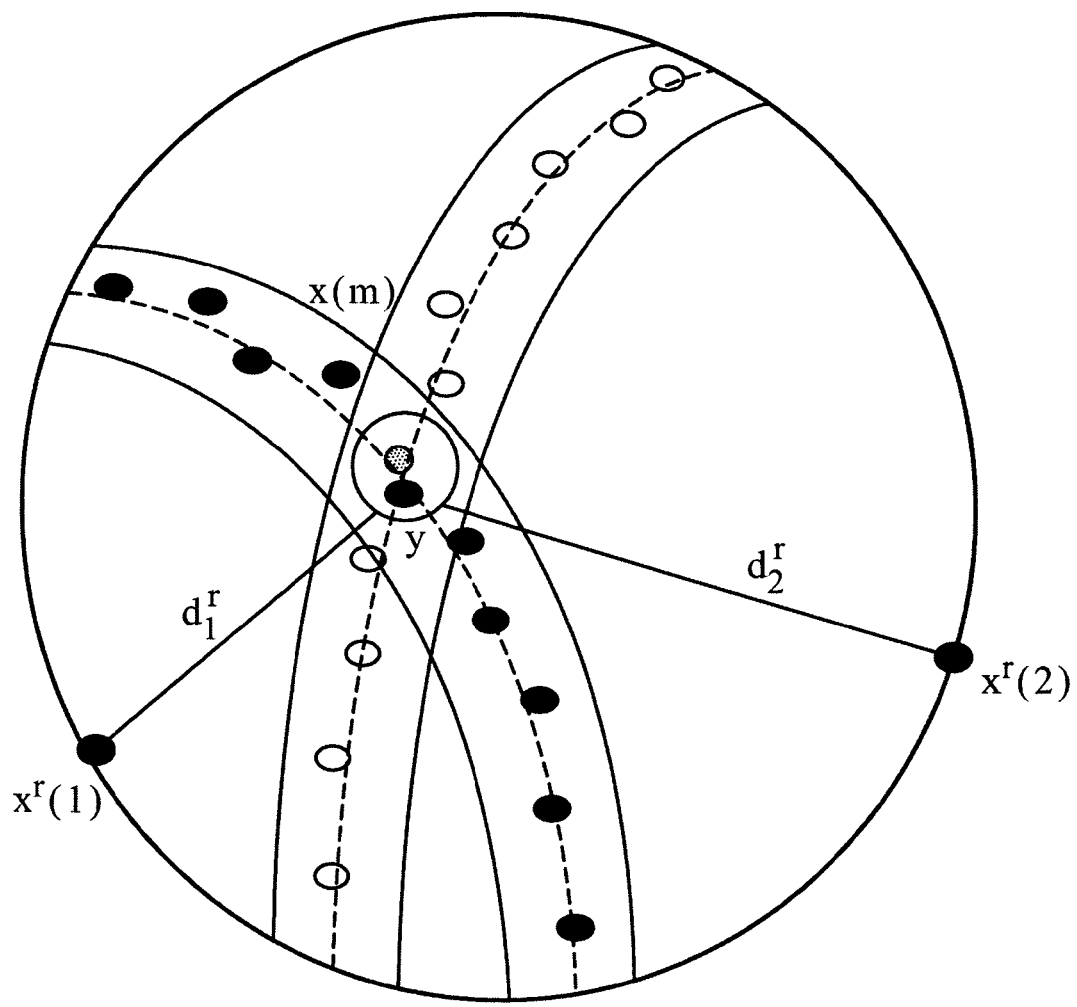
FIG. 5: Example of the reference list identification based on the reference codeword distances. An image of surface microstructure y (4) of an item is acquired by a camera of a customer/service user portable device (mobile phone, Pocket PC, Smartphone, PDA, Palm, etc.) at VGA or higher resolution compatible with optical properties used by the manufacturer at the enrollment stage (FIG. 3). Assuming that the list of reference codewords contains only two elements $x^r(1)$ and $x^r(2)$, i.e., L=2, the corresponding reference distances $d^r = [d_1^r, d_2^r]$ are computed. Under the assumption of Gaussian statistics of microstructure codewords and sufficiently large N one can expect that all x will be concentrated on the surface of the sphere of a radius proportional to the square root of variance of the Gaussian distribution and their length. Then, the final list of candidates used for the maximum likelihood decision about item identity (FIG. 4) is obtained as an intersection of codeword sets that contain the candidates satisfying a certain equidistance constraint formulated due to the acquisition channel statistics to the reference codewords $x^r(1)$ and $x^r(2)$, respectively. In the ideal conditions, the final list will include only a single candidate (marked in white) and the system will mimic a cryptographic hash. However, in the general case, a final set cardinality is larger than one and depends on the acquisition conditions defined by the camera resolution, lighting conditions, etc.

An example demonstrating the essence of the candidates list generation is presented in FIG. 5 for the case of Gaussian assumption about the statistics of both distance codewords $x^r(1)$ and $x^r(2)$ and item microstructure image y. In this case, the condition of distance from a particular reference codeword to an acquired item microstructure defines two sets of candidates defined by the distance radios $d_1^r$ and $d_2^r$ that are located within a spherical shell with a width defined by the acquisition conditions (more noise assumes wider width). Then, the final set of the codewords that is used for the decoding contains those elements that belong to both reference sets (indicated by the intersection of two sets). In the case the optimal system design, such a list will contain a unique codeword x(m). In a sub-optimal case that might happen for instance in the situation of only approximate compatibility of acquisition systems used at the enrollment and identification, the dimensionality of this list can be larger.

The described system only exemplifies a possible construction of the reference coordinate system where the reference codewords are chosen at random according to some key K. Obviously, to ensure maximum security, performance and low complexity one should imagine an optimal section of the reference coordinate system. The experimental results revealed that for the mobile phone acquisition with a camera working in the VGA mode 100-200 reference codewords would be sufficient to cope with the above requirements.

The solution according to the invention has several advantages: it is not necessary to compute any full size cross-correlation with real images but only hashes (i.e., binary strings) are compared. For good quality images the hash practically serves as a pointer to the database entry, i.e, directly provides the item ID. In case there are some errors in the hash (e.g. due to low image quality) first a selection of list of candidates as explained is performed and only then in this list a search is done that provides considerable acceleration of search speed. Additionally, in case there are errors in hash: in the second advocated approach based on random projections it is known in advance which bits (or binary decisions) are correct (more reliable) and which are not. This gives immediately a chance to check only those suspicious bits which positions are known. Moreover, the maximum number of possibly incorrect bits is known in advance. Computations show that for a database of about 4 (2^32) Billion items and SNR of about 30 dB, about 10-11 error bits out of 32 bits are to be checked. This means that 2^11 candidates are to be checked that is a small number compared to the size of the database.

Random Projection-Based Identification

Figure 6:
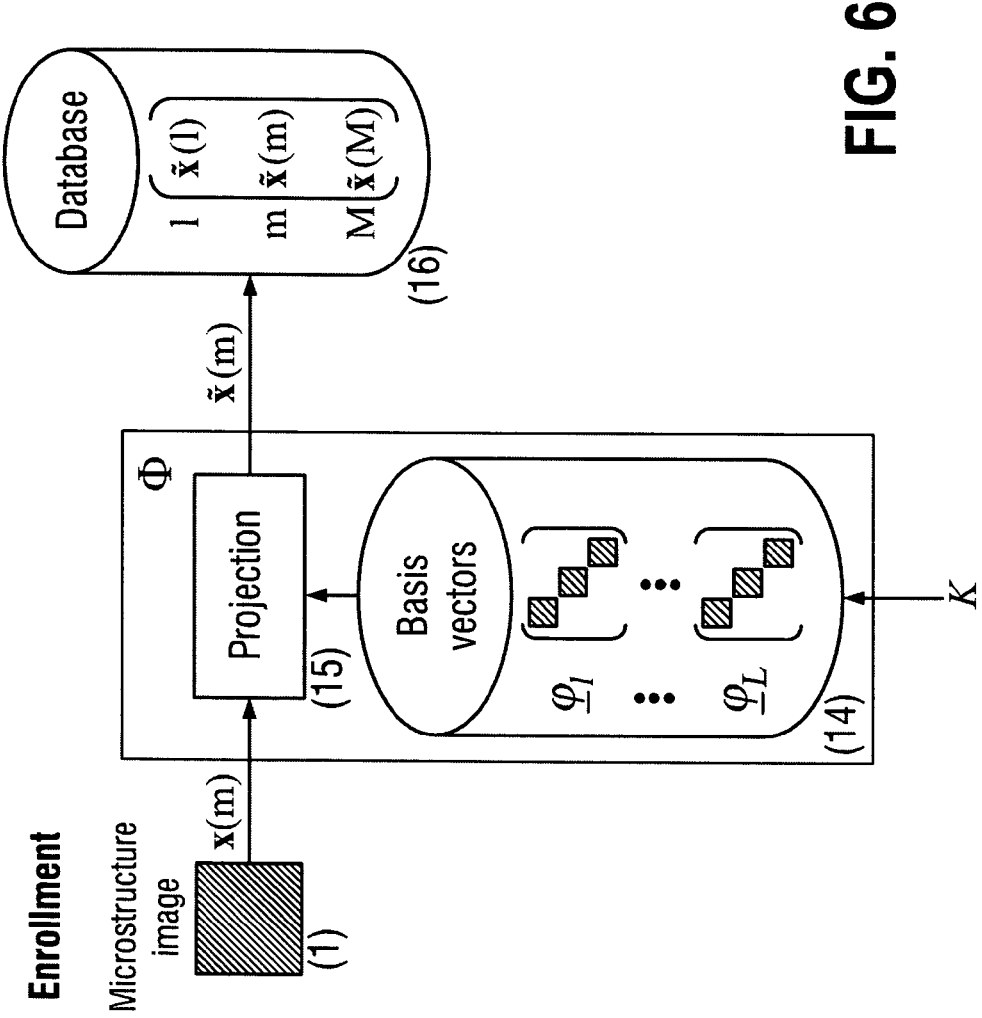
FIG. 6: An embodiment for the enrollment part of the proposed system of an item identification/authentication using unique unclonable microstructure features created by either the nature or humans based on randomized projections. An image of surface microstructure x(m) (1) of an item acquired during the manufacturing process by a camera operating at VGA or higher resolution that is compatible with optical properties of typical portable devices (mobile phone, Pocket PC, Smartphone, PDA, Palm, etc is an input to a projection block (15). At this stage, it is projected onto a set of randomly and in a secure way generated (based on a secret key K) set of L basis vectors $\phi_j$, $1 \le j \le L$ (14). It is supposed that every projection $\phi_j$, $1 \le j \le L$, is used to produce one single element $\tilde{x}_j(m)$. However, multiple projections can be generated for the same j thus resulting into a vector $\tilde{x}_j(m)$. Further, we will use vector notations for this operation. The main goal of randomized projection is threefold. First, it is proven that such a projection is able to provide a certain invariance of its output to some classes of signal processing manipulations [8]. Second, a key-dependence of (15) adds a certain security level by randomization a particular transformation domain. Third, in order to meet computational complexity constraints, the dimensionality reduction is achieved by a particular selection of Finally, projection outputs $\tilde{x}(m)$ are collected in a database (16).
Figure 7:
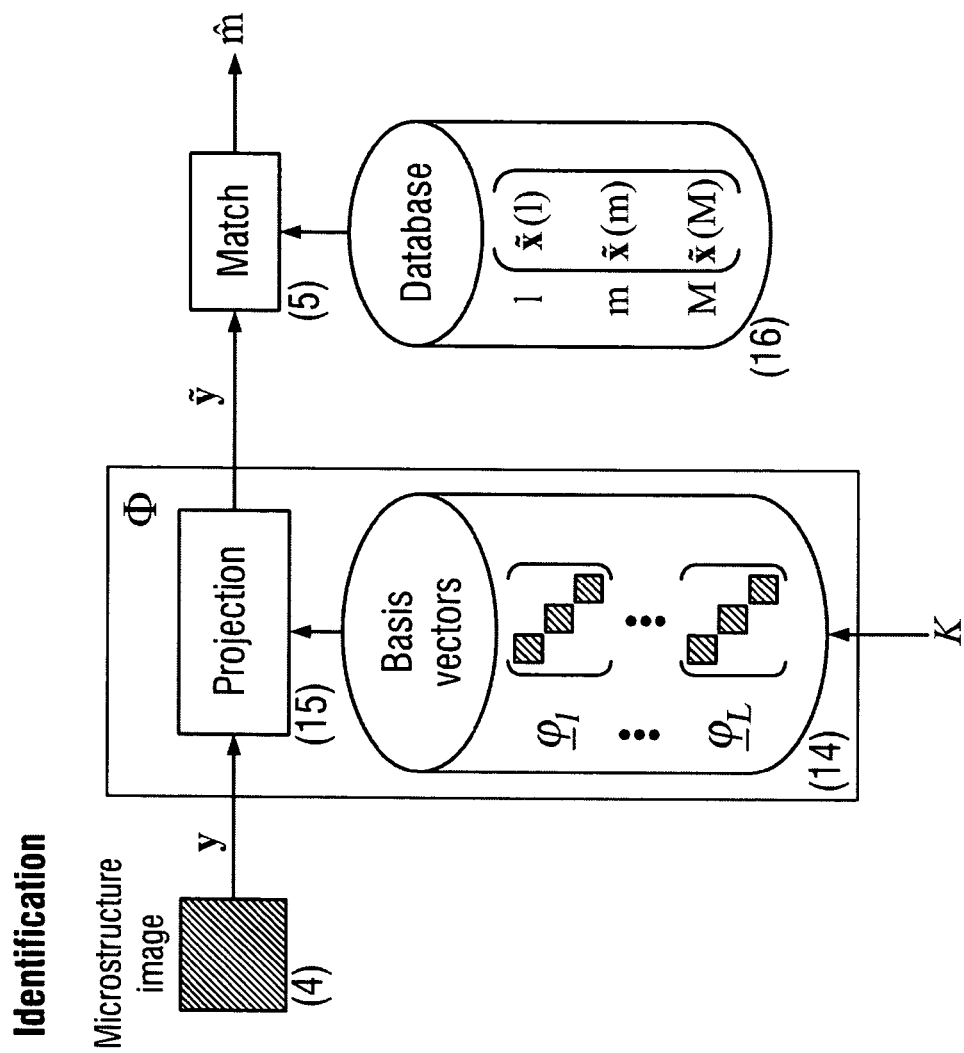
FIG. 7: An embodiment for the identification part of the proposed system of item packaging identification using unique unclonable microstructure features created by either the nature or humans based on randomized projections. An image of surface microstructure y (4) of an item is acquired by a camera of a customer/service user portable device (mobile phone, Pocket PC, Smartphone, PDA, Palm, etc.) at VGA or higher resolution compatible with optical properties used by the manufacturer on the enrollment stage (FIG. 6) is an input to a projection block (15). At this stage, it is projected onto a set of randomly and in a secure way generated (based on a secret key K) set of L basis vectors $\phi_j$, $1 \le j \le L$ (14). The reasoning for such a projecting is justified in the description of FIG. 6. The output of projection is passed to the match (5) stage where a closeness between and database (16) entries $\tilde{x}(i)$, $1 \le i \le M$ is verified with respect to a particular criterion (minimum square or Hamming distance, minimum variance, minimum divergence, etc.) and the index $\hat{m}$ of the particular database entry $\tilde{x}(\hat{m})$ that meets this criterion is declared as the item identifier(s). In the case none out of M database entries satisfies the criterion, the identity of an item is rejected.

An example of linear mapping can be provided using random projections as a transform $\Phi$. The identification system consists of two main stages, i.e., enrollment shown in FIG. 6 and identification shown in FIG. 7. At the enrollment stage, the acquired image of item microstructure x(m) (1) is projected into the image $\tilde{x}(m)$ of a reduced dimensionality using mapping $\Phi \in R^{L \times N}$. The set of basis vectors $\phi_j$, $1 \leq j \leq L$, that forms the transform $\Phi$, is generated from any specified distribution, for example, $$j_{-j} \sim N\left(0, \frac{1}{N}\right),$$

to confirm the properties of orthoprojection, i.e., $\Phi\Phi^T = I^{N \times N}$, where $I^{N \times N}$ is an identity matrix. The seed for the random generator is considered to be a secret key K. Alternatively, one can select an image of microstructure and construct a transformation basis using known orthogonalization procedures. Moreover, the vectors $\phi_j$ can contain also sub-basis vectors to produce a redundant output for an enhanced security, robustness and invariance to geometrical transformations. The resulting vectors $\tilde{x}(m)$ are stored in the database for all M.

In order to further extend the robustness of the identification system, one can generate basis vectors with the targeted invariance properties. A list of possible candidates includes for instance Fourier transform magnitude, Fourier-Melline, Radon transform domains, a set of randomized basis functions that can be filtered to obtain the desired robustness (for example low-pass or band-pass filtering), domain of data moments, etc. The output of this projection $\tilde{x}(m)$ is stored in a corresponding database (16).

Moreover, one can also foresee such a transformation that will either maximally preserve inter-codeword distances after transformation or makes it possible to reconstruct original codewords x(m) based on the projections $\tilde{x}(m)$. This property will ensure the preservation of distribution of vector distances. It can be achieved by applying the above orthoprojection mapping to the data x(m) that was previously decomposed using any transform such as DCT or wavelet producing a sparse output. In this case one can preserve only the largest coefficients choosing such L basis vectors that will guarantee the reconstruction of such kind of data.

The identification stage of the system based on random projection transform Φ consists of the same transformation of the acquired data y (FIG. 7) using transform (15) into the vector ỹ of dimensionality L. It is important to note that the vector ỹ∈$P^L$ and it can be considered as a result of a secure dimensionality reduction. Finally, vector y is matched with the database (16) using a certain distance criterion (minimum of Euclidian distance, any metric associated with dynamic programming or divergence might be among valid candidates). In the case a corresponding match is found satisfying the above distance requirements, its index is declared as the item identity. In the opposite case, the identity of this object is not established.

Figure 8:
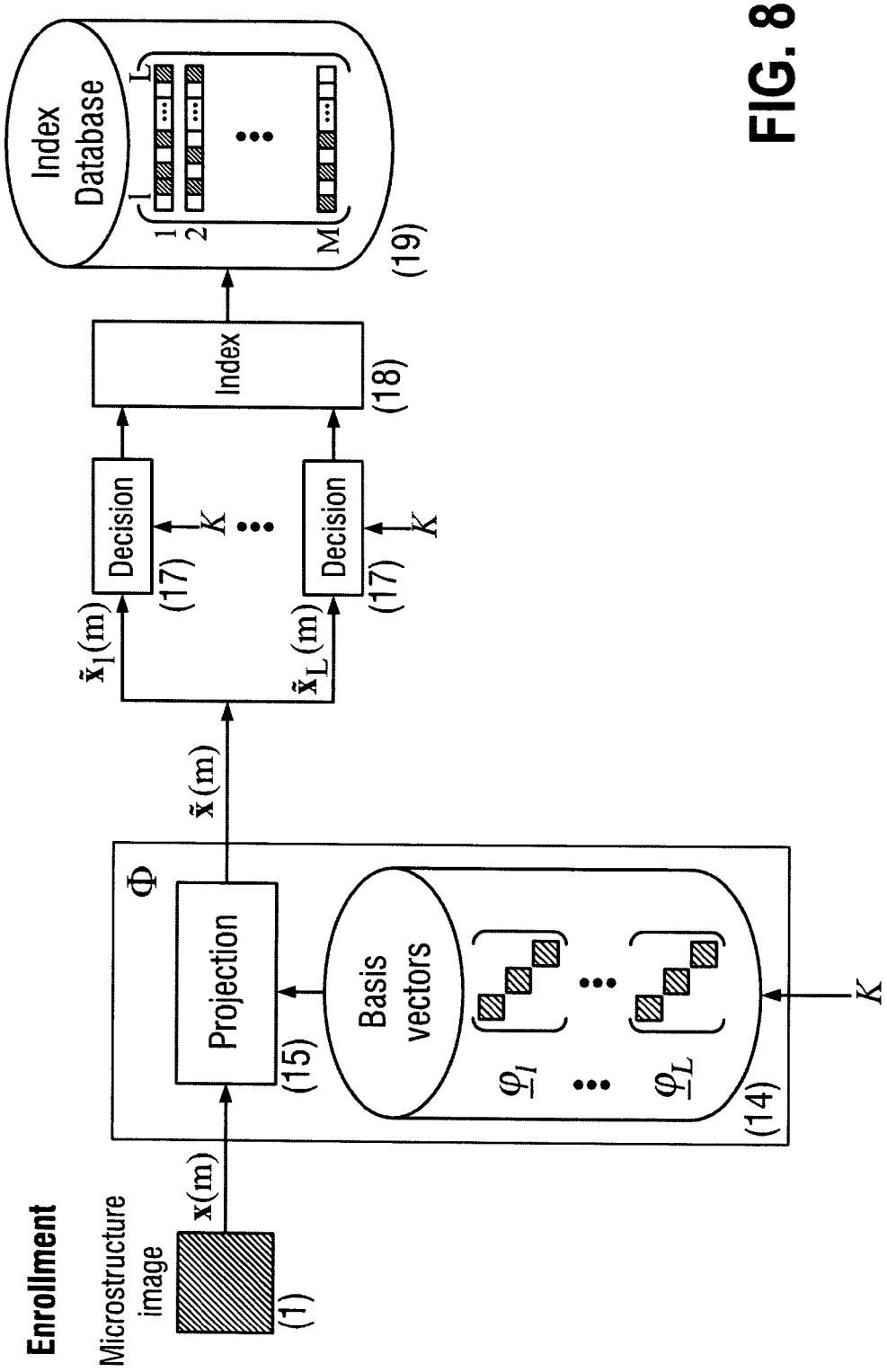
FIG. 8: An embodiment for the enrollment part of the proposed system of item identification using unique unclonable microstructure features created by either the nature or humans based on randomized projections and index database generation based on binary hypothesis testing. An image of surface microstructure x(m) (1) of an item acquired during the manufacturing process by a camera operating at VGA or higher resolution that is compatible with optical properties of typical portable devices (mobile phone, Pocket PC, Smartphone, PDA, Palm, etc.) is an input to a projection block (15). At this stage, it is projected onto a set of randomly and in a secure way generated (based on a secret key K) set of L basis vectors $\phi_j$, $1(14)$. Then, the projection outputs $\tilde{x}(m)=[\tilde{x}_1(m), \tilde{x}_2(m), \ldots, \tilde{x}_L(m)]$ are passed to a decision making step (17). Here, binary decisions (17) are made based on their comparison with key-dependent thresholds. On the next stage, the obtained binary decisions are combined together (concatenation, composition, etc.) in order to produce a binary L-dimensional representation of an index m serving as an item index (18). Finally, the obtained binary indexes are organized in an index database (19). In addition, the reliability of each binary decision (17) can be validated and only reliable decision or bits can be taken into account to produce the desired L-dimensional representation of an index m. The reliability of binary decisions can be based on the angles between the data x(m) and basis vectors $\phi_j$, $1 \le j \le L$. The closer such an angle to 90 degree, the less reliable decision one observes and when the angle is deviating away from 90 degree, the more reliable projection is to various distortions. Therefore, the absolute value of the projected data could be a good measure of decision reliability.
Figure 9:
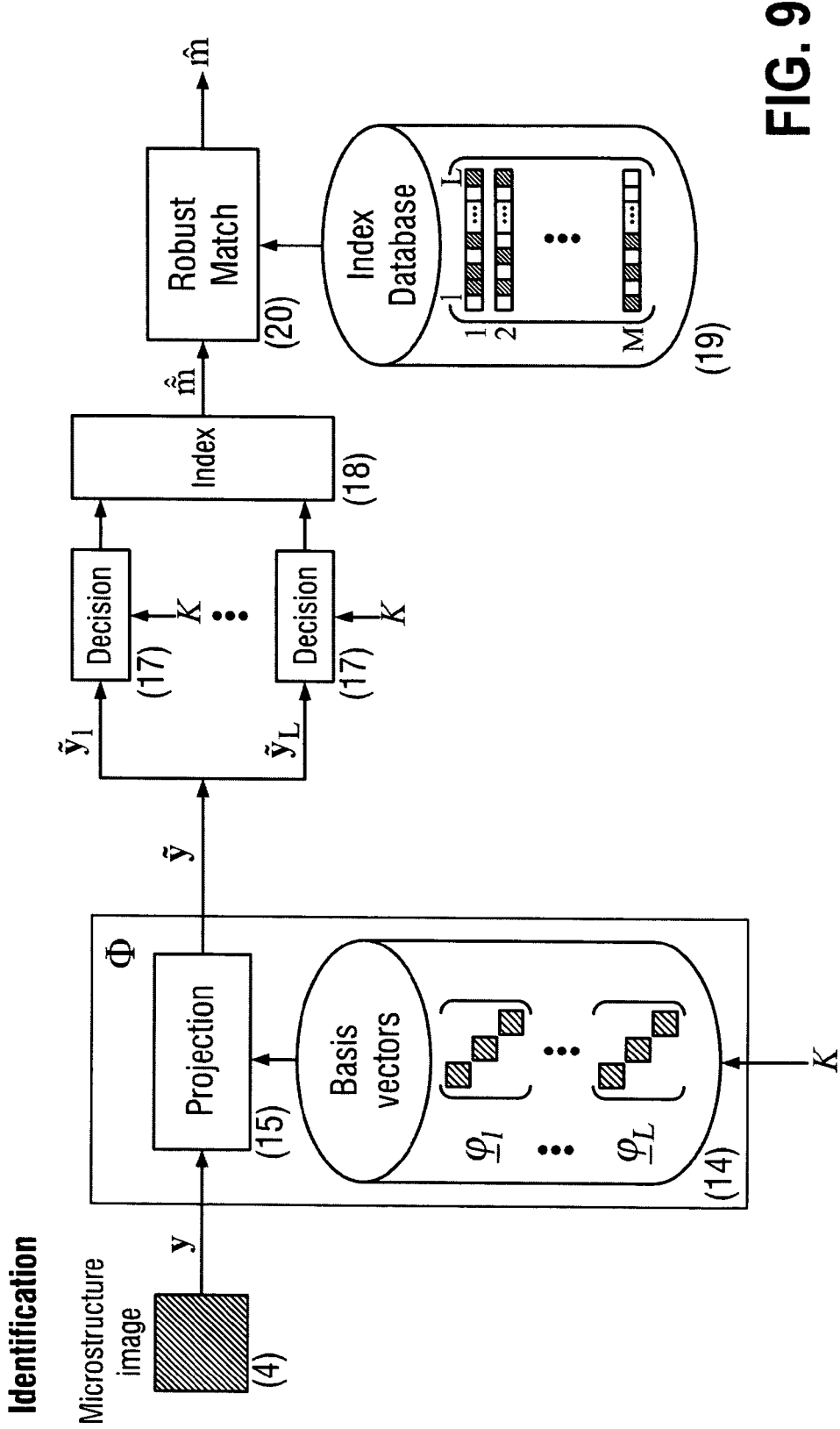
FIG. 9: An embodiment for the identification part of the proposed system of items identification using unique unclonable microstructure features created by either the nature or humans based on randomized projections and index database generation based on binary hypothesis testing. An image of surface microstructure y (4) of an item extracted from an open environment of goods and product circulation is acquired by a camera of a customer/service user portable device (mobile phone, Pocket PC, Smartphone, PDA, Palm, etc.) at VGA or higher resolution compatible with optical properties used by the manufacturer on the enrollment stage (FIG. 8) is an input to a projection block (15). At this stage, it is projected onto a set of randomly and securely generated (based on a secret key K) set of L basis vectors $\phi_j$, $1 \le j \le L$ (14). Then, projection outputs $\tilde{y}=[\tilde{y}_1, \tilde{y}_2, \ldots, \tilde{y}_L]$ are passed to a decision making step (17). Here, binary decisions are made based on their comparison with key-dependent thresholds. On the next stage, the obtained binary decisions are combined together according to a method selected at the enrollment stage (concatenation, composition, etc.) in order to produce a binary L-dimensional representation of index $\hat{m}$ (18). Finally, a robust matching procedure (20) in terms of minimum norm, variance, Levenstein distance, warping or dynamic programming, etc., is applied in order to determine the index $\hat{m}$ of the particular index database (19) entry that minimizes a selected matching criterion. In case such a match is found, $\hat{m}$ is declared as an item identifier also assuming multiple closest match results. In the case none out of M database entries satisfies the criterion, the identity of an item is rejected. Moreover, the usage of reliability of each binary decision (17) makes possible to select the most reliable decisions or bits to produce the final L-dimensional representation of an index m. Such an approach leads to the considerable reduction of probability of error of each binary decision as well as overall average probability of error of identification and authentication. Moreover, since the number of errors in the binary decision vector/index is also considerably reduced the list of possible candidates becomes smaller that enables to speed up of matching procedure.

The case when the main output of the enrollment stage is an index of the codeword produced in the invariant domain is presented in FIG. 8, while its identification counterpart is present in FIG. 9. At enrollment, the output of secure projection x̃(m) (15) is parsed into a certain number of blocks x̃$_1$(m), x̃$_2$(m), ..., x̃$_L$(m). A key-dependent decision (17) is taken based on every block in binary or M-ary sense. Finally, the item surface microstructure codeword index (18) is produced and stored in index database (19).

In addition, one can also accelerate the speed of identification as well as enhance the accuracy using the function of binary decision or bit correctness. One possible decision correctness function can be the function integrating the value of projected data and the equivalent noise in the projection domain and can be expressed as the Q-function of their ratio. The reasons for such a selection are twofold. First, the reliability of binary decisions is proportional to the angles between the data x(m) and basis vectors φ$_j$, 1≤j≤L. The closer such an angle to 90 degree, the less reliable decision one observes and when the angle is deviating away from 90 degree, the more reliable projection is to various distortions. Thus, the absolute value of the projected data is a good measure of decision reliability. Second, the reason for the Q-function and the equivalent possibly Gaussian noise approximation is related to the fact that the original noise distribution is transformed into the distribution close to Gaussian due to the summation of all independent projection components that corresponds to the conditions of Central Limit Theorem or immediately satisfied in the case of Gaussian basis vectors. The knowledge of decision correctness or bit reliability considerably accelerates the matching by providing the priority rule for the selection of list of possible candidate indexes containing the most reliable decisions or bits. At the final identification, the index (18) produced using a set of binary or M-ary decisions (17) performed based on the output of secure projection Φ (15) y split into a set of blocks y$_1$(m), y$_2$(m), ..., y$_L$(m) is matched with the content of index database (19) in order to define the object identity m̂ that is performed according to a specific criterion (like in the case of FIG. 7) using Hamming, Levenstein or warping distances. Finally, the above described decision or bit correctness/reliability function might be used for speeding up the matching according to any above distance or their modifications with the corresponding weights. Such kind of weights can be either binary, i.e., either decision is reliable (weight 1) and is taking into account for the distance computation or unreliable (weight 0) and is neglected, or normalized real values between 0 and 1.

Item Authentication

While the main task of item identification is to provide the answer to the question "Is the item stored in the database and if yes what is the available information about it?" during authentication one is trying to certify if the item is original or it is a fake. The details of item authentication protocol based on item surface microstructure are presented in FIG. 10-11. During enrollment, an item microstructure x (1) is transformed into a secure domain of reduced dimensionality and is encoded using a random binning principle (21). In the current setting, the random binning is referring to the structure of the codebook where the item microstructure transformed codewords are randomly distributed among certain number of bins (S) with J codewords in each bin. The encoder produces two indexes, the index B of the bin where current microstructure codeword x (1) is located and this codeword index in the identified bin A. Then, a composition (22) of an encrypted with a secret key codeword index and the bin index [B,K⊕A] is produced and transferred to the storage in a database or reproduction (23) on the surface of an item. One can additionally encrypt the index B as [B⊕K] or using another key and hash the index A.

During authentication, the decoder (24) that operates in a distributed manner retrieves the composed index [B,K⊕A] stored on an item surface and uses the bin index part B as a pointer to the bin to find the estimate of the codeword index in this bin using the codeword that is the closest to ỹ in some sense. The output of the decoder Â is used to decipher the key used for encryption of the codeword index in the bin. Finally, the original version of the key K used during enrollment that is assumed to be symmetrically available for authentication is compared with the obtained key estimate K̂ and a binary decision (25) about the object authenticity is made depending on the comparison result.

Figure 12:
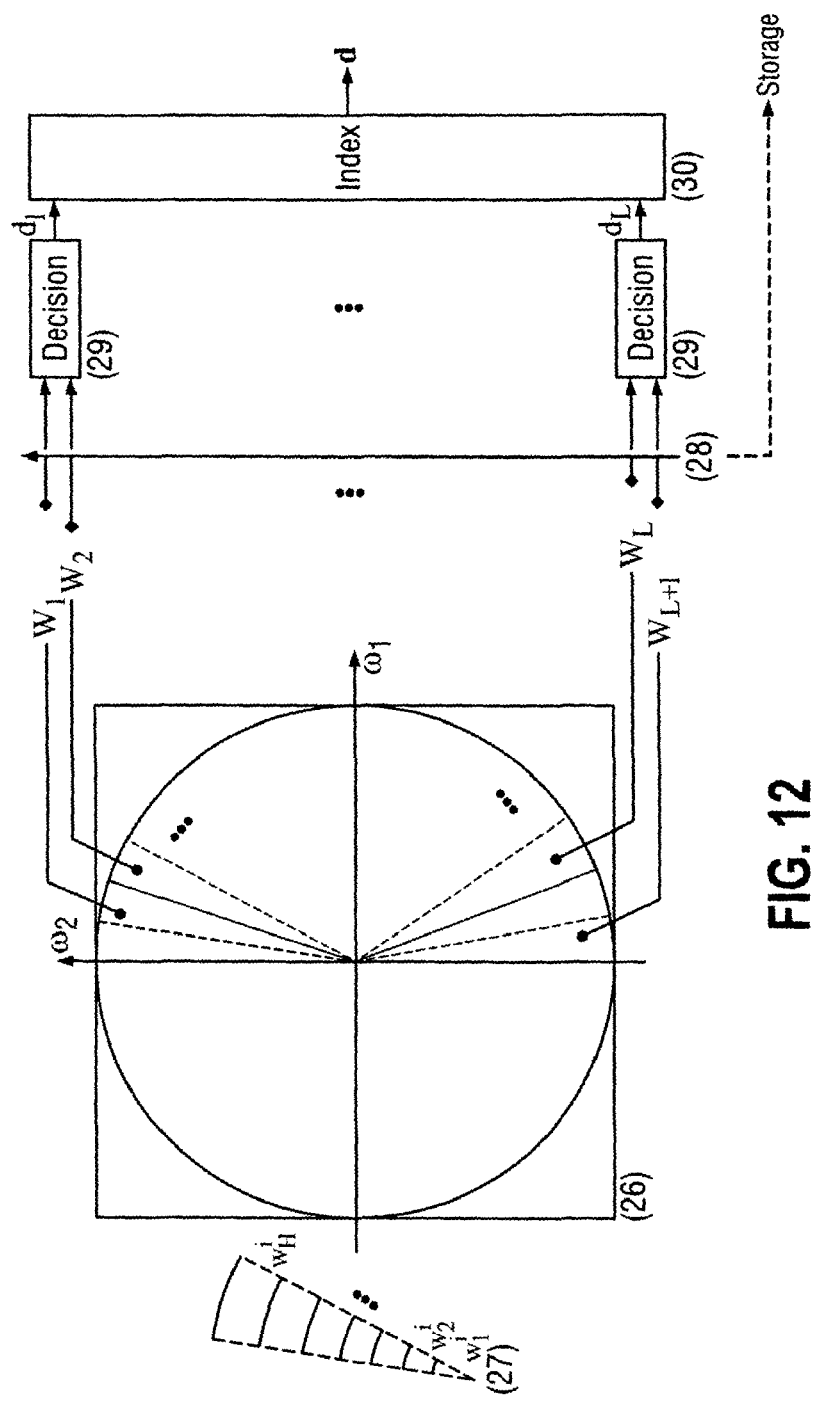
FIG. 12: An example of an item index robust generation. An image of an item acquired during the manufacturing process by a camera operating in VGA or higher resolution that is compatible with optical properties of typical portable devices (mobile phone, Pocket PC, Smartphone, PDA, Palm, etc.) is transferred to some transform domain (Fourier, Fourier-Mellin transforms, etc. could be valid candidates) (26). A polar parsing of the obtained transform representation is performed using randomized partially overlapping sectors for the images or blocks for vectors. The randomized weights $w_k^i$, 1≤k∈H, (27) in each $i^{th}$ sector are used with twofold goal. First, it play a role of a secure transform for the surface microstructure of an item and its result can be stored in a database (28) as a sort of hash. Second, these data taken from partially overlapping pairs of sectors are used to form weighted sums $W_i$, $$W_i = \sum_{k=1}^{H} \tilde{x}_k w_k^i,$$

Evidently, joint robustness to a class of signal processing distortions as well as to some desyncronization degradations is crucial for object authentication as well as for their identification. Such a property can be granted via the invariant domain mapping as it is described in FIG. 12. It is widely known that a certain class of transforms (like Fourier, Fourier-Mellin transforms) provide a certain level of invariance to some geometrical distortions including translation, rotation and scaling. However, such invariance is limited to only several transforms and cannot be provided when multiple transformations are applied. For example, Fourier magnitude is only invariant to translation but is sensitive to rotation and scaling. In order to overcome this drawback, and to provide the reliable results for hashing, we propose an algorithm that converts the rotation into cyclic shift of hash values and remains robust to the translation and scaling. First, object microstructure image is transferred in one of the mentioned transform domains. Then, a parsing of the transform representation on random size semi-overlapping sectors is performed. On the next stage the data within the sectors w$_k$, 1≤k≤H is used to produce a randomized weighted sums $$W_j = \sum_{k=1}^{H} l_k w_k^j,$$

1≤j≤L, that taking into account the assumed independent identically distributed nature of the noise reduces its variance by a factor that depends on this randomized projection. The produced randomized weighted sums W$_j$ are stored (28) in a database and used for a pairwise decision making that follows binary or M-ary strategy. Decision outputs are combined together by concatenation or any other combination (29) in order to produce a microstructure codeword index d.

A common step for both identification and authentication is a selection of the prevention measures based on the results of identification/authentication and registration of the request. By registering the device identifier (IP address, phone number, user login, etc.) from which the identification/authentication request is performed, one obtains the advantage of controlling and preventing attempts to attack the system on the product and/or server levels, track the information about the requests performed based on the submitted data and thus providing system confirmation about the item authenticity, consumption or distribution. By registering the number of successful checks of different product items from a given portable device, one can award the device holder by the special product price reductions, sales, participation in the various lotteries or granting the portable device owner some extra free service to motivate the authentication demands.

Item Surface Microstructure Acquisition

Acquisitions of item surface microstructure (31) and protocol synchronization mechanism according to the present invention are organized as it is presented in FIG. 13-17. The main acquisition terminal is a customer portable device (32) equipped by the embedded camera. Capturing microstructure of object surface and at the same time to avoid cloning, copying or reproduction of these data might be not feasible with low-resolution cameras of certain class of outdated but still in use portable devices. In order to overcome this problem and to make the service of object authenticity/identity verification available to every customer that has such a device equipped with any optical camera two solutions are proposed. According to the first one (FIG. 13) a macrolense enhancing the portable device camera optical properties (13) is attached to the surface of this device. The object surface microstructure (31) is then located in the focal plane of the obtained compound system and acquired.

The second solution presented in FIG. 14 foresees a possibility to produce items with macrolenses (34) attached to or integrated into directly their surfaces. In this situation acquisition of the object surface microstructure is accomplished directly by the portable device.

Since during acquisition some imperfectness can be introduced, for instance by not accurate positioning of the portable imaging device, certain mechanisms assisting protocol synchronization are proposed in the present invention. In the first scenario (FIG. 15) in order to point out the physical location of the object surface microstructure that should be used in object identity/authenticity verification it is assumed that a synchronization pattern of a special form (36) is applied to the object surface (30) by means of printing, laser engraving, painting, gluing, stamping, etc. The pattern has a marker in one of the corners to simplify recovery after rotation on a certain angle. It is also assumed that this pattern can be reproduced on the transparent packaging (35) and can disappear after item opening.

In the case when the acquisition of the object microstructure is organized according to the principles demonstrated in FIG. 14, several ways of pattern (36) enrollment on the item surface (30) or transparent packaging (35) are possible both assuming that it is covered by macrolenses. The difference consists in a particular method of enrollment, i.e., by printing, laser engraving, painting, gluing, stamping, etc. on the top of this surface (FIG. 16) or by corroded deepening inside the surface (FIG. 17) and by a kind of a macrolense used (34) in the former cases and (37) in the latter case.

An alternative way of resynchronization of acquired random surface microstructure, which is produced by means of printing with ordered halftone, is presented in FIG. 18. The main idea of this approach is related to the properties of discrete Fourier transform magnitude spectrum of periodic signals. Since printed in such a way microstructure will be periodic due to the properties of the dithering used (38) this corresponds to the periodic magnitude spectrum (39) that allows a natural design of the resynchronization pattern. Then, the imperfectness introduced during object surface microstructure acquisition at its identification/authentication (39) can be estimated and compensated using the detected periodic picks present in the magnitude spectrum.

Authentication of Artworks

The present invention also addresses the microstructure-based identification and authentication of artworks, luxury goods or more generally items that are prohibited to modify. Such a restriction complicates a synchronization since no synchronization marking is allowed to be added to the item. The proposed solution to this problem is presented in FIG. 19. The artwork item (42) is placed in front of a personal computer (43) equipped by a media projector (45) and a camera (44). The role of (43) and (45) is to highlight the frame of the object shape and the areas on the surface of the item $x^i(m)$, $1 \le i \le P$ (42) from where the microstructures should be acquired (marked by white rectangles), while the camera (44) should assist the synchronization of item frame with the projected frame. Finally, the acquired areas in a form of object surface microstructures are organized as an item database where a unique link between the artwork item and its set of codewords $x^i(m)$ is established. Obviously, for security reasons, storage memory and complexity requirements, the database is organized as HT presented in this invention.

Identification and Secret Key Extraction Based on Physical Unclonable Functions

Physical attacks aiming at disclosure of the secret key has become a real challenge today. In the case the secret is learned by the unauthorized user, he/she gains the complete power of the authorized one. In order to prevent such a disclosure, we propose in this invention to extend the described identification framework based on the physical unclonable functions. FIG. 20 presents their involvement in the object identification protocol. Before the identification, the server (47) sends a challenge m to the customer. The challenge defines the part of the object surface microstructure (31) acquired by the customer portable device digital camera with a macro lens. Then, the obtained photo is transferred to the server (47) where a physical unclonable function h' is computed based on y. The obtained result is matched with a content of the $m^{th}$ bin of the database (48) in order to find such $h_i^m$, $1 \le i \le J_m$, that are in some predefined sense (Euclidian distance, Levenstein distance, variance, etc.) close with it. In the case a single candidate $h_i^m$, $1 \le i \le J_m$, is found, its index i is declared as the object identity. In the opposite case, the identity of the object is rejected. In the case of the identity confirmation, the server returns to the customer a secret key $k_i^m$, $1 \le i \le J_m$, that has a unique link with $h_i^m$, $1 \le i \le J_m$. Furthermore, in order to prevent application of the physical attack that is targeting secret revealing especially for the situation when multiple use of the same key is exploited and the unicity distance is not high, the pair $h_i^m$, $k_i^m$, $1 \le i \le J_m$, is marked as a used one and the key $k_i^m$, $1 \le i \le J_m$, will never be used with the same challenge m.

Application Domains

The described method of item identification and authentications is applicable to numerous secure or non-secure applications, which are (but are not limited to) the following:
- prevention of creation of identical copies whereas the counterfeits are made with the same ingredients, formulas and packaging as originals, but not by the original manufacturer;
- prevention of creation of look-alikes when the counterfeits are featuring high-quality packaging and convincing appearances whereas look-alikes contain little or no active ingredients and may be made with harmful or neutral substances;
- prevention of usage of rejected products or brands that have been rejected by the manufacturer for not meeting quality standards;
- prevention of usage re-labeled goods or brands when either their expiration dates are passed or been distributed by unauthorized sources, or the value, quality or quantity been modified;
- prevention of reuse, refillment or illegal circulation of objects, goods or products;
- product or packaging tracking, tracing, quality of service control, market analysis, advertisement, promotion, marketing as well as investigation of sources of counterfeiting or counterfeited objects distribution and selling;
- secure delivery and distribution of products through any distribution channels in any country or region supporting said communication services;
- joint integration with RFIDs, barcodes, Electronic Product Codes (EPC), Physical Markup Language (PML) or any other marking methods.

At the same time, the proposed methods are applicable to many kinds of products, brands and packaging, which are (but are not limited to) the following: anti-counterfeiting labels or packaging, boxes, shipping invoices, tax stamps, postage stamps and various printed documents associated with the product for authentication and certification of its origin; medical prescriptions; medicines and pharmaceutical products including but not limited to cough drops, prescription drugs, antibiotics, etc.; adulterated food, beverages, alcohol as well as coffee and chocolate; baby food and children toys; clothing, footwear and sportswear; health, skin care products, personal care and beauty aids items including perfume, cosmetics, shampoo, toothpaste, etc.; household cleaning goods; luxury goods including watches, clothing, footwear, jewelry, glasses, cigarettes and tobacco, products from leather including handbags, gloves, etc. and various objects of art; car, helicopter and airplane parts and electronic chipsets for computers, phones and consumer electronics; prepaid cards for communications or other services using similar protocol of credit recharging; computer software, video and audio tapes, CDs, DVDs and other means of multimedia data storage with music, movies and video games.

Simultaneously, the proposed methods can be used for the authentication of lost or stolen objects including but not limited to cars, vehicles, luxury goods or arts or purchase of the second hand or used objects with the need to identify their origin and to prevent the attempts of unauthorized resell when the potential buyer is communicating the microstructure data and authentication index to the said authentication server whose address is either common for the given brand, group of products or provided by the certified authority, who manages the corresponding database that contains the corresponding data of the above objects, their parts or components, and takes the decision depending on the authentication server reply or potentially providing the feedback information about the people attempting to perform the above unauthorized actions, while with the possibility of remote database update about the lost or stolen object and personal data uniquely identifying the claiming person.

Finally, it can be applied to the documents certifying the origin, state or ownership status of objects that includes but it is not limited by the car or vehicle technical passports, permits of circulation, certificates of origin, notary documents establishing the object ownership, etc. to prevent the attempts of unauthorized object misuse when the certificate number is communicated to the said authentication server that contains the copy of the certificate or the recent updated status that can be sent back to the requesting party.

It is noted that storing the resulting data in the database of structured indexes is performed jointly with the identification information about the item. This information about the item can comprise item ID, time, place, etc., of manufacturing or enrollment.

The transformation of the acquired image into key-dependent secure and invariant domain comprises choosing a secret key and using it, wherein said key is used for encoding the data into secure authentication item index based on said secret key.

The method according to the invention can use instructions encoded on a computer-readable medium, wherein instructions of the method for scanning an item as well as the enrollment step and storing the obtained information is done with an enrollment system for which various parts are described above. The enrollment system as well as the method steps used within this system can be used on a stand alone basis for creation of the item packages and/or for the creation of the database.

The method according to another embodiment of the invention further comprises instructions usable within an acquisition device, which especially can be any portable device with an electronic part for the execution of the authentifictaion method. Such an acquisition device can be a device having a camera to capture an image of the protected item. The acquisition device as well as the method steps used within this device can be used on a stand alone basis for authentication of an item package.

The method according to a different further embodiment of the invention further comprises instructions usable within the same more complex or a different identification device, which especially can be a cell phone having a camera to capture an image of the protected item and to contact the database. Then specific comparing instructions are executed within the control software of the database, which can be used in connection with the enrollment system; but the database and its control unit can also be separated from the enrollment system. This acquisition device as well as the method steps used within this device can be used on a stand alone basis for identification of an item package in connection with complementary method steps and a complementary identification system comprising said database.

The present invention is a method and apparatus for protection of various items against counterfeiting using physical unclonable features of item microstructure images. The protection is based on the proposed identification and authentication protocols coupled with portable devices. In both cases a special transform is applied to data that provides a unique representation in the secure key-dependent domain of reduced dimensionality that also simultaneously resolves performance-security-complexity and memory storage requirement trade-offs. The enrolled database needed for the identification can be stored in the public domain without any risk to be used by the counterfeiters. Additionally, it can be easily transportable to various portable devices due to its small size. Notably, the proposed transformations are chosen in such a way to guarantee the best possible performance in terms of identification accuracy with respect to the identification in the raw data domain. The authentication protocol is based on the proposed transform jointly with the distributed source coding. Finally, the extensions of the described techniques to the protection of artworks and secure key exchange and extraction are disclosed in the invention.

The below references are incorporated by reference herein in their entirety and relied upon:

[1]. T. D. Hayosh. Apparatus and method for enhancing check security. U.S. Pat. No. 6,600,823, filled 16, Oct. 1997, published 29, Jul. 2003.

[2]. W. A. Houle. Light sensitive invisible ink compositions and methods for using the same. U.S. Pat. No. 6,513,921, filled 12, May. 2000, published 4, Feb. 2003.

[3]. G. Colgate. Document Protection by Holograms. Optical Document Security, R. van Renesse, Ed., Artech House, Norwood, Mass., 1993.

[4]. C. K. Harmon. Lines of Communication: Bar Code and Data Collection Technologies for the 90S. Helmers Pub, 1994.

[5]. I. J. Cox, M. L. Miller, and J. A. Bloom. Digital Watermarking. Morgan Kaufmann Publishers, Inc., San Francisco, 2001.

[6]. Z. F. Keith, T. Knox, and E. J. Schneider. Method and apparatus for detecting photocopier tracking signatures. U.S. Pat. No. 6,515,764, filled 18, Dec. 1998, published 4, Feb. 2003.

[7]. J. Koniecek and K. Little. Security, ID Systems and Locks: The Book on Electronic Access Control. Elsevier Computers/Computer Security, 1997.

[8]. J. Fridrich. Robust bit extraction from images. In Proceedings of ICMCS' 99, volume 2, pages 536-540, Florence, Italy, June 1999.

[9]. R. Venkatesanan, S. Koon, M. Jacubowski, and P. Moulin. Robust image hashing. In Proceedings of ICIP 2000, Vancouver, BC, Canada, September 2000.

[10]. J. Brosow and E. Furugard, Method and a system for verifying authenticity safe against forgery, U.S. Pat. No. 4,218,674, filled 20, Apr. 1978, published 19, Aug. 1980.

[11]. Y. Kariakin. Authentication of articles. Patent WO/1997/024699, filled 29, Dec. 1995, published 10, Jul. 1997.

[12]. J. Colinaue, J.-C., Lehureau, R. Binet, Method for optical authentication and identification of objects and device therefore, Patent WO 2005/057525, filled 10, Dec. 2003, published 8, Jul. 2004.

[13]. R. P. Cowburn, J. D. R. Buchanan, Method and apparatus for creating authenticatable articles and subsequently verifying them, Patent WO 2005/088517 A1, filled 13, Aug. 2004, published 22, May. 2005.

[14]. R. P. Cowburn, Authenticity verification methods, products and apparatuses, Patent GB 2417074, filled 13, Aug. 2004, published 15, Feb. 2006.

[15]. R. P. Cowburn, J. D. R. Buchanan, P. Seem, Optical authentication, Patent US 2007/0165208 A1, filled 22, Dec. 2006, published 19, Jul. 2007.

[16]. R. P. Cowburn, J. D. R. Buchanan, Authenticity verification by means of optical scattering, Patent WO 2006/120398 A1, filled 11, May. 2005, published 16, Nov. 2006.

[17]. D. Ezra, T. Hare, P. C. Pugsley, Secure device, Patent GB 2221870, filled 31, May. 1988, published 31. May. 1989.

[18]. S. Denenberg, R. Petersen, J. Densberger, J. J. Christensen, System for registration, identification and verification of items utilizing unique intrinsic features, U.S. Pat. No. 5,521,984, filled 10, Jun. 1993, published 28, Jun. 1996.

[19]. R. D. Melen, Record document authentication by microscopic grain structure and method U.S. Pat. No. 5,325,167, filled 11, Jun. 1992, published 28, Jun. 1994.

[20]. J. R. Smith, Workpiece authentication based upon one or more workpiece images, Patent WO/2000/065541, filled 19, Apr. 2000, published 2, Nov. 2000.

[21]. J. R. Smith, E. Metois, M. J. Murphy, System and method for authentication and tracking of a workpiece that includes an optically active medium, Patent US 2003063772, filled 6, Sep. 2002, published 3, Apr. 2003.

[22]. J. R. Smith, P. M. Yarin, M. J. Murphy, A. V. Sutherland, Method and apparatus for linking data and objects, Patent WO 02/27617 A2, filled 29, Sep. 2000, published 4, Apr. 2002.

[23]. M. J. Murphy, J. R. Smith, E. Metois, System and method for authentication and tracking of a workpiece, Patent AU 20022336444 A8, filled 6, Sep. 2002, published 14, Apr. 2003.

[24]. J. R. Smith, P. M. Yarin, M. J. Murphy, E. Metois, Personal mail piece tracing and tracking mechanism, Patent WO 0227618A2, filled 28, Sep. 2001, published 4, Apr. 2002.

[25]. R. Pappu, N. Gershenfeld, J. R. Smith, Identification and verification using complex, three-dimensional structural features, U.S. Pat. No. 6,584,214, filled 19, Oct. 1999, published 24, Jul. 2003.

[26]. J. R. Smith, System and method for authentication of a workpiece using three dimensional shape recovery, Patent WO 03/087991 A2, filled 9, Apr. 2002, published 23, Oct. 2003.

[27]. J. R. Smith and A. V. Sutherland. Microstructure-based indicia. In Second Workshop on Automatic Identification Advanced Technologies, pages 79-83, Morristown, N.J., USA, October 1999.

[28]. H. Sugino, K. Ito and T. Shimizu, Document verification system, Patent US 2004/0079800, filled 9, Apr. 2003, published 29, Apr. 2004.

[29]. F. Jordan, M. Kutter, C. di Venuto, Means for using microstructure of materials surface as a unique identifier, Patent WO 2007/028799 A1, filled 5, Sep. 2006, published 15, Mar. 2007.

[30]. P. Burt, Fast and efficient search method for graphical data, Patent WO 92/15965, filled 4, Mar. 1992, published 17, Sep. 1992.

[31]. J. L. Smith, Real-time transformation of incoherent light images to edge-enhanced darkfield representation for cross-correlation applications, U.S. Pat. No. 4,371,866, filled 21, Nov. 1980, published 1, Feb. 1983.

[32]. P. S. Ravikanth, Physical one-way functions, PhD Thesis, MIT, March 2001.

[33]. T. Matsumoto, H. Matsumoto, K. Yamada, S. Hoshino, Impact of artificial gummy" fingers on fingerprint systems. In: Optical Sec. and Counterfeit Deterrence Techn. IV. Volume 4677 of Proc. of SPIE, 2002.

[34]. J. L. Bentley. Multidimensional binary search trees used for associative searching. Communications of the ACM, 18:509-517, 1975.

[35]. A. Jain, P. Moulin, M. I. Miller and K. Ramchandran, "Information-Theoretic Bounds on Target Recognition Performance Based on Degraded Image Data," *IEEE Trans. on Pattern Analysis and Machine Intelligence*, Vol. 24, No. 9, pp. 1153-1166, September 2002.

[36]. C. C. Leang and D. H. Johnson. On the asymptotics of M-hypothesis Bayesian detection. *IEEE Trans. Info. Th.* 43: 280-282, January 1997.

The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures, which may be considered new, inventive and industrially applicable.

Multiple variations and modifications are possible in the embodiments of the invention described here. Although certain illustrative embodiments of the invention have been shown and described here, a wide range of modifications, changes, and substitutions is contemplated in the foregoing disclosure. While the above description contains many specifics, these should not be construed as limitations on the scope of the invention, but rather as exemplifications of one or another preferred embodiment thereof. In some instances, some features of the present invention may be employed without a corresponding use of the other features. Accordingly, it is appropriate that the foregoing description be construed broadly and understood as being given by way of illustration and example only, the spirit and scope of the invention being limited only by the claims which ultimately issue in this application.

We claim:

1. A computerized method encoded on a non-transitory computer-readable medium, the method scanning an item for fast and secure identification and authentication of valuable items, or identifying their validity, expiration date or origin, the method comprising the steps of:

(a) acquiring a microstructure image of item surface using authenticated imaging device;

(b) transforming acquired image into key-dependent secure and invariant domain through key-dependent random projections of acquired data or key-based reference codeword transformation that establishes distances between the acquired data and key-defined reference codewords;

(c.) using the transformed data for item enrollment with the purpose of identification consisting of storing the resulting data of step (b) in a database of structured indexes jointly with identification information about the item of manufacturing or enrollment and for item enrollment with the purpose of authentication consisting of encoding the data of step (b) into secure authentication item index based on secret key, followed by its storage in the database or reproduction on the item surface, packaging or accompanying authentication documents, certificates or cards;

(d) verifying the item under inspection by acquiring the image of microstructure using either authenticated or not imaging device and transforming acquired image into key-dependent secure and invariant domain through key-dependent random projections of acquired data or key-based reference codeword transformation that establishes the distances between the acquired data and key-defined reference codewords and establishing its identity by making a decision about the item identity using a search in a list of possible candidates and deciding about a single or multiple matches and establishing its authenticity by acquiring authentication index enrolled at step (c), decoding the authentication data from the index and transformed data and making the decision about item authenticity using the same key used for enrollment;

(e) registering the request and its results from step (d) in the database of requests and information about a requested party accordingly and informing the requesting party about a result of request execution, and wherein said invariant domain transformation and key-dependent projections are performed jointly on the magnitude image spectrum by computing key-dependent functions from the specified possibly overlapping regions of image spectrum calculating the differences between the specified regions and either storing these differences in the database or making the binary decisions about their relationships with their next storing in the database in such a way that when the same procedure is repeated at the identification or authentication stage for the possibly geometrically distorted image said differences or results of binary decisions will represent a cyclic shift with respect to the measured ones that is identified either directly or using cross-correlation on the real or binary data.

2. A computerized method encoded on a non-transitory computer-readable medium, the method scanning an item for fast and secure identification and authentication of valuable items, or identifying their validity, expiration date or origin, the method comprising the steps of:

(a) acquiring a microstructure image of item surface using authenticated imaging device;

(b) transforming acquired image into key-dependent secure and invariant domain through key-dependent random projections of acquired data or key-based reference codeword transformation that establishes distances between the acquired data and key-defined reference codewords;

(c.) using the transformed data for item enrollment with the purpose of identification consisting of storing the resulting data of step (b) in a database of structured indexes jointly with identification information about the item of manufacturing or enrollment and for item enrollment with the purpose of authentication consisting of encoding the data of step (b) into secure authentication item index based on secret key, followed by its storage in the database or reproduction on the item surface, packaging or accompanying authentication documents, certificates or cards;

(d) verifying the item under inspection by acquiring the image of microstructure using either authenticated or not imaging device and transforming acquired image into key-dependent secure and invariant domain through key-dependent random projections of acquired data or key-based reference codeword transformation that establishes the distances between the acquired data and key-defined reference codewords and establishing its identity by making a decision about the item identity using a search in a list of possible candidates and deciding about a single or multiple matches and establishing its authenticity by acquiring authentication index enrolled at step (c), decoding the authentication data from the index and transformed data and making the decision about item authenticity using the same key used for enrollment;

(e) registering the request and its results from step (d) in the database of requests and information about a requested party accordingly and informing the requesting party about a result of request execution, and wherein said functions of key-dependent transformation include all forms of transforms possibly with the dimensionality reduction that are optimized in preserving inter item distances for identification and dimensionality reduction techniques with possible invertibility applied to the image of microstructure with the specified statistics achieved after additional invertible transform leading to the sparse data representation and preserving vector and distribution distances wherein the basis vectors of the transform are generated from the random generator with the seed defined by the secret key satisfying properties of orthoprojections.

3. The method claim 1 wherein said function of computing distance to the key-defined codewords uses either artificial codewords generated from the distribution similar to the distribution of microstructure images or sampled images acquired from the real microstructures and said distances are defined as vector distances between any binary or real vectors.

4. The method claim 2 wherein said function of computing distance to the key-defined codewords uses either artificial codewords generated from the distribution similar to the distribution of microstructure images or sampled images acquired from the real microstructures and said distances are defined as vector distances between any binary or real vectors.

* * * * *